United States Patent
Li et al.

(10) Patent No.: US 11,665,535 B2
(45) Date of Patent: May 30, 2023

(54) METHOD, APPARATUS, AND SYSTEM FOR DUAL-CONNECTIVITY COMMUNICATION

(71) Applicant: Huawei Technologies Co., Ltd., Shenzhen (CN)

(72) Inventors: He Li, Shanghai (CN); Jing Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 192 days.

(21) Appl. No.: 16/916,481

(22) Filed: Jun. 30, 2020

(65) Prior Publication Data

US 2020/0336899 A1  Oct. 22, 2020

Related U.S. Application Data

(63) Continuation of application No. PCT/CN2019/100095, filed on Aug. 9, 2019.

(30) Foreign Application Priority Data

Aug. 10, 2018  (CN) .......................... 201810911030.6

(51) Int. Cl.
*H04W 12/033* (2021.01)
*H04W 76/15* (2018.01)
(Continued)

(52) U.S. Cl.
CPC ....... *H04W 12/033* (2021.01); *H04W 12/106* (2021.01); *H04W 76/15* (2018.02); *H04W 84/18* (2013.01)

(58) Field of Classification Search
None
See application file for complete search history.

(56) References Cited

U.S. PATENT DOCUMENTS

2016/0191471 A1  6/2016  Ryoo et al.
2016/0205547 A1  7/2016  Rajadurai et al.
(Continued)

FOREIGN PATENT DOCUMENTS

CN  106941700 A  7/2017
CN  107710806 A  2/2018
(Continued)

OTHER PUBLICATIONS

GPP TSG SA, "Study on the Security for 5G URLLC(Release 16)", 3GPP TR 33.825 V1.0.0, May 28, 2019, 28 pages.
(Continued)

*Primary Examiner* — Brian S Roberts
(74) *Attorney, Agent, or Firm* — Conley Rose, P.C.

(57) ABSTRACT

A method, an apparatus, and a system for dual-connectivity communication, where the method may include: sending, by a master Node, a first message to a secondary Node, where the first message includes a user plane security policy, and the user plane security policy is used by the secondary Node to determine a user plane security protection method between the secondary Node and a user terminal; receiving, by the master Node, a second message from the secondary Node, where the second message includes user plane security enabling type indication information, and the user plane security enabling type indication information is used to indicate a user plane security protection method between the secondary Node and the user terminal; and sending, by the master Node, a third message to the user terminal, where the third message includes the user plane security enabling type indication information.

36 Claims, 8 Drawing Sheets

(51) Int. Cl.
*H04W 12/106* (2021.01)
*H04W 84/18* (2009.01)

(56) References Cited

U.S. PATENT DOCUMENTS

| | | | |
|---|---|---|---|
| 2017/0318505 A1 | 11/2017 | Park et al. | |
| 2018/0098250 A1 | 4/2018 | Vrzic et al. | |
| 2018/0206138 A1 | 7/2018 | Hayashi et al. | |
| 2018/0242209 A1 | 8/2018 | Xu et al. | |
| 2019/0327642 A1 | 10/2019 | Peng et al. | |
| 2020/0374320 A1* | 11/2020 | Li | H04W 12/02 |
| 2021/0076218 A1* | 3/2021 | Wifvesson | H04L 5/0007 |
| 2021/0084130 A1* | 3/2021 | Dai | G06F 21/64 |
| 2021/0153286 A1* | 5/2021 | Park | H04W 76/22 |

FOREIGN PATENT DOCUMENTS

| | | |
|---|---|---|
| CN | 108282817 A | 7/2018 |
| CN | 108307389 A | 7/2018 |
| KR | 20160141002 A | 12/2016 |
| WO | 2014177107 A1 | 11/2014 |
| WO | 2015037926 A1 | 3/2015 |
| WO | 2015047051 A1 | 4/2015 |

OTHER PUBLICATIONS

3GPP TS 33.401 V15.4.0, 3rd Generation Partnership Project; Technical Specification Group Services and System Aspects; 3GPP System Architecture Evolution (SAE); Security architecture (Release 15), Jun. 2018, 162 pages.

Ericsson, "DC-Handling of UP security policy in SN", S3-182356, 3GPP TSG-SA WG3 Meeting #92, Aug. 24, 2018, 3 pages.

3GPP TS 33.501 V15.1.0, 3rd Generation Partnership Project; Technical Specification Group Services and System Aspects; Security architecture and procedures for 5G system (Release 15), Jun. 2018, 152 pages.

Ericsson, "Handling of maximum supported data rate per UE for integrity protection", S2-184765, 3GPP TSG-SA WG2 Meeting #127-Bis, May 28-Jun. 1, 2018, 19 pages.

3GPP TS 23.502 V15.2.0, Jun. 2018, "3rd Generation Partnership Project; Technical Specification Group Services and System Aspects; Procedures for the 5G System; Stage 2 (Release 15)," 308 pages.

3GPP TS 37.340 V15.2.0, Jun. 2018, "3rd Generation Partnership Project; Technical Specification Group Radio Access Network; Evolved Universal Terrestrial Radio Access (E-UTRA) and NR; Multi-connectivity; Stage 2 (Release 15)," 55 pages.

* cited by examiner

METHOD, APPARATUS, AND SYSTEM FOR DUAL-CONNECTIVITY COMMUNICATION

CROSS-REFERENCE TO RELATED APPLICATIONS

This application is a continuation of International Patent Application No. PCT/CN2019/100095, filed on Aug. 9, 2019, which claims priority to Chinese Patent Application No. 201810911030.6, filed on Aug. 10, 2018. The disclosures of the aforementioned applications are hereby incorporated by reference in their entireties.

TECHNICAL FIELD

Embodiments of this application relate to the field of communications technologies, and specifically, to a method, an apparatus, and a system for dual-connectivity communication.

BACKGROUND

With development of communications technologies, to meet a security requirement in a 5th generation (5G) scenario, in addition to user plane encrypted protection in a long term evolution (LTE) system, user plane integrity protection is introduced. The user plane integrity protection protects integrity of data in a user plane transmission process. Moreover, user plane on-demand security is further introduced, to be specific, the user plane encrypted protection and the user plane integrity protection can be enabled as required.

Currently, in a scenario of a single connection between a user terminal (for example, user equipment (UE)) and a network node, namely, a scenario in which only one network node serves the user terminal, a procedure for enabling user plane security between the user terminal and the network node may include: 1. A session management network element sends a user plane security policy obtained by the session management network element to the network node (namely, a base station), where the user plane security policy includes that the user plane encrypted protection is required to be enabled, preferred to be enabled, or does not need to be enabled, and the user plane integrity protection is required to be enabled, preferred to be enabled, or does not need to be enabled. 2. For "required", the network node enables corresponding protection; for "not needed", the network node does not need to enable corresponding protection; for "preferred", the network node determines, depending on whether a resource is sufficient, whether to enable corresponding protection. 3. The network node sends a radio resource control (RRC) reconfiguration request message to the user terminal, where the message carries indication information of a user plane protection type, and the indication information is used to indicate whether to enable the encrypted protection and whether to enable the integrity protection. 4. The user terminal receives an RRC reconfiguration message from the network node, activates corresponding user plane security according to indication information of the user plane protection type, and generates a protection key the same as that of the network node. 5. The user terminal sends an RRC reconfiguration response message to the network node.

The foregoing procedure for enabling user plane security is specific to a 5G single connection scenario. In a 5G dual connectivity scenario, namely, a scenario in which one user terminal is connected to two network nodes (a master Node and a secondary Node), how to enable user plane security protection between the user terminal and the secondary Node is a technical problem that urgently needs to be resolved.

SUMMARY

Embodiments of this application provide a method, an apparatus, and a system for dual-connectivity communication, to resolve a technical problem of how to enable user plane security protection between a user terminal and a secondary Node in a 5G dual connectivity scenario, thereby ensuring confidentiality and integrity of user plane data transmission in the 5G dual connectivity scenario.

A first aspect of the embodiments of this application provides a method for dual-connectivity communication, including: sending, by a master Node, a first message to a secondary Node, where the first message includes a user plane security policy, and the user plane security policy is used by the secondary Node to determine a user plane security protection method between the secondary Node and a user terminal; receiving, by the master Node, a second message from the secondary Node, where the second message includes user plane security enabling type indication information, and the user plane security enabling type indication information is used to indicate the user plane security protection method between the secondary Node and the user terminal; and sending, by the master Node, a third message to the user terminal, where the third message includes the user plane security enabling type indication information.

According to the first aspect of the embodiments of this application, the master Node sends the user plane security policy to the secondary Node. The secondary Node determines the user plane security protection method between the secondary Node and the user terminal according to the user plane security policy, and sends, to the master Node, the user plane security enabling type indication information indicating the user plane security protection method between the secondary Node and the user terminal. The master Node sends the user plane security enabling type indication information to the user terminal, such that the user terminal activates the user plane security protection method between the user terminal and the secondary Node according to the user plane security enabling type indication information, thereby enabling the user plane security protection between the user terminal and the secondary Node, and ensuring confidentiality and integrity of user plane data transmission in a 5G dual connectivity scenario.

The user plane security policy includes user plane encrypted protection indication information and user plane integrity protection indication information. The user plane encrypted protection indication information is used to indicate three possible values: not needed, preferred, and required. The user plane integrity protection indication information is used to indicate three possible values: not needed, preferred, and required. The value "not needed" indicates that activation is not needed, that is, enabling is not performed; "preferred" indicates that activation may be or may be not performed, that is, enabling may be or may be not performed; and "required" indicates that activation is needed, that is, enabling is performed.

In a possible implementation, before the master Node sends the first message to the secondary Node, if the secondary Node does not support user plane integrity protection, the master Node determines that user plane integrity protection indication information in the user plane security policy is not "required", that is, "preferred" or "not needed".

In a possible implementation, the first message further includes a security capability of the user terminal, and the security capability of the user terminal refers to encryption algorithms and integrity protection algorithms that are supported by the user terminal. The first message carries the security capability of the user terminal, such that the secondary Node selects, from the security capability of the user terminal, based on a system in which the base station is located, a security algorithm to be used between the secondary Node and the user terminal.

In a possible implementation, the second message further includes a security algorithm between the secondary Node and the user terminal. Additionally, the third message further includes the security algorithm between the secondary Node and the user terminal. To be more specific, the secondary Node notifies, using the master Node, the user terminal of the security algorithm selected by the secondary Node, such that the user terminal performs security protection or security deprotection on user plane data according to the security algorithm selected by the secondary Node.

In a possible implementation, before the master Node sends the first message to the secondary Node, the master Node obtains a first user plane security policy of the user terminal. The first user plane security policy is an original user plane security policy. A granularity of the first user plane security policy of the user terminal may be a packet data unit (PDU) session, that is, different PDU sessions correspond to different user plane security policies. A granularity of the first user plane security policy may alternatively be one or more of a network slice, a quality of service flow, a data radio bearer, or the like.

The master Node may obtain, in a PDU session establishment process, the user plane security policy of the user terminal from a core network element. Alternatively, the master Node may obtain, in a base station handover process, the user plane security policy of the user terminal from a source base station when the master Node is used as a target base station.

In a possible implementation, the first message further includes user plane information corresponding to the user plane security policy, such that the user terminal can learn that user plane data received from the master Node and the secondary Node belongs to a same PDU session. The user plane information may include a PDU session identifier, and may further include one or more of a network slice identifier, a quality of service flow identifier, a 5G quality of service flow identifier, a data radio bearer identifier, and the like.

In a possible implementation, the user plane security policy carried in the first message is the first user plane security policy of the user terminal. To be more specific, the master Node directly sends the first user plane security policy obtained by the master Node to the secondary Node, such that the secondary Node generates a mapped user plane security policy according to the first user plane security policy, and determines the user plane security protection method between the secondary Node and the user terminal according to the mapped user plane security policy.

In a possible implementation, the user plane security policy carried in the first message is a second user plane security policy generated by the master Node according to the first user plane security policy of the user terminal. Before sending the first message to the secondary Node, the master Node generates the second user plane security policy according to the first user plane security policy of the user terminal. The second user plane security policy is a mapped user plane security policy generated by the master Node. When receiving the second user plane security policy, the secondary Node may directly determine the user plane security protection method between the secondary Node and the user terminal according to the second user plane security policy.

The master Node may generate the second user plane security policy based on a capability of the master Node and a capability of the secondary Node and according to the first user plane security policy, such that the second user plane security policy can be used by both the master Node and the secondary Node. The capability of the master Node or the secondary Node may include one or more of information, for example, whether enabling of user plane encrypted protection is supported and whether enabling of user plane integrity protection is supported, a resource usage status, a supported security algorithm, a current status, or configuration information.

In a possible implementation, if the secondary Node does not support user plane integrity protection, when user plane integrity protection indication information in the first user plane security policy is "required", user plane integrity protection indication information in the second user plane security policy generated by the master Node is "not needed".

In a possible implementation, the master Node determines a user plane security protection method between the master Node and the user terminal according to the second user plane security policy. If a user plane security termination point is on the secondary Node, the master Node does not activate the user plane security protection method between the master Node and the user terminal. That is, the master Node does not perform security protection or security deprotection on user plane data according to the user plane security protection method between the master Node and the user terminal.

In a possible implementation, the master Node receives a third user plane security policy from the secondary Node, where the third user plane security policy is generated by the secondary Node according to the first user plane security policy of the user terminal. That is, the third user plane security policy is a mapped user plane security policy of the secondary Node. The secondary Node notifies the master Node of the mapped user plane security policy of the secondary Node, such that the master Node learns of the user plane security protection method between the secondary Node and the user terminal. After learning of the user plane security protection method between the secondary Node and the user terminal, the master Node may set the user plane security protection method between the master Node and the user terminal to be the same as the user plane security protection method between the secondary Node and the user terminal.

In a possible implementation, when receiving the third user plane security policy from the secondary Node, the master Node may send the third user plane security policy to an access management network element. The third user plane security policy may indicate the user plane security protection method between the secondary Node and the user terminal, such that the access management network element learns of a user plane security enabling result.

In a possible implementation, the master Node may determine the third user plane security policy according to the user plane security enabling type indication information, and send the third user plane security policy to an access management network element, such that the access management network element learns of a user plane security enabling result.

In a possible implementation, the master Node receives uplink user plane data from the user terminal, where the uplink user plane data is data obtained after the user terminal performs security protection according to the user plane security protection method between the user terminal and the secondary Node. Additionally, the master Node sends the uplink user plane data to the secondary Node. Therefore, when receiving the uplink user plane data, the secondary Node performs security deprotection on the uplink user plane data according to the user plane security protection method between the secondary Node and the user terminal.

A second aspect of the embodiments of this application provides a master Node. The master Node has a function of implementing the method provided in the first aspect. The function may be implemented by hardware, or implemented by hardware executing corresponding software. The hardware or the software includes one or more modules corresponding to the foregoing function.

In a possible implementation, the master Node includes a transceiver unit configured to: send a first message to a secondary Node, where the first message includes a user plane security policy, and the user plane security policy is used by the secondary Node to determine the user plane security protection method between the secondary Node and a user terminal; receive a second message from the secondary Node, where the second message includes user plane security enabling type indication information, and the user plane security enabling type indication information is used to indicate the user plane security protection method between the secondary Node and the user terminal; and send a third message to the user terminal, where the third message includes the user plane security enabling type indication information. The master Node may further include a processing unit configured to generate a second user plane security policy.

In a possible implementation, the master Node includes a processor, a transceiver, and a memory. The memory stores a computer program, the computer program includes a program instruction, and the processor is configured to invoke program code, to perform the following operations: sending a first message to a secondary Node, where the first message includes a user plane security policy, and the user plane security policy is used by the secondary Node to determine a user plane security protection method between the secondary Node and a user terminal; receiving a second message from the secondary Node, where the second message includes user plane security enabling type indication information, and the user plane security enabling type indication information is used to indicate a user plane security protection method between the secondary Node and the user terminal; and sending a third message to the user terminal, where the third message includes the user plane security enabling type indication information. The master Node may further include a processing unit configured to generate a second user plane security policy.

Based on a same concept, for a problem-resolving principle and beneficial effects of the master Node, refer to the method and beneficial effects brought by the method in the first aspect. Therefore, for implementation of the apparatus, refer to implementation of the method. Repeated content is not described again.

A third aspect of the embodiments of this application provides a computer-readable storage medium. The computer-readable storage medium stores an instruction, and when the instruction is run on a computer, the computer is enabled to perform the method according to the first aspect.

A fourth aspect of the embodiments of this application provides a computer program product including an instruction. When the computer program product is run on a computer, the computer is enabled to perform the method according to the first aspect.

A fifth aspect of the embodiments of this application provides a method for dual-connectivity communication, including: receiving, by a secondary Node, a first message from a master Node, where the first message includes a user plane security policy; determining, by the secondary Node, a user plane security protection method between the secondary Node and a user terminal according to the user plane security policy; activating, by the secondary Node, the user plane security protection method between the secondary Node and the user terminal; and sending, by the secondary Node, a second message to the master Node, where the second message includes user plane security enabling type indication information, and the user plane security enabling type indication information is used to indicate the user plane security protection method between the secondary Node and the user terminal.

According to the fifth aspect of the embodiments of this application, the secondary Node: determines the user plane security protection method between the secondary Node and the user terminal based on the user plane security policy; activates the user plane security protection method between the secondary Node and the user terminal; and sends, to the master Node, the user plane security enabling type indication information used to indicate the user plane security protection method between the secondary Node and the user terminal. As such, the master Node sends the user plane security enabling type indication information to the user terminal, thereby enabling user plane security between the user terminal and the secondary Node, and ensuring confidentiality and integrity of user plane data transmission in a 5G dual connectivity scenario.

In a possible implementation, the first message further includes a security capability of the user terminal. Additionally, the secondary Node may select a security algorithm between the secondary Node and the user terminal based on the security capability of the user terminal.

In a possible implementation, the second message further includes a security algorithm between the secondary Node and the user terminal. Additionally, the master Node notifies the user terminal of the security algorithm between the secondary Node and the user terminal, such that the user terminal may perform security protection or security deprotection according to the security algorithm between the secondary Node and the user terminal.

In a possible implementation, the first message further includes user plane information corresponding to the user plane security policy. As such, the user terminal can learn that user plane data received from the master Node and the secondary Node belongs to a same PDU session.

In a possible implementation, activating, by the secondary Node, the user plane security protection method between the secondary Node and the user terminal may include: activating, by the secondary Node, the user plane security protection method between the secondary Node and the user terminal according to the user plane security protection method between the secondary Node and the user terminal, the security algorithm between the secondary Node and the user terminal, and based on a security key between the secondary Node and the user terminal.

In a possible implementation, the secondary Node generates a security key between the secondary Node and the user terminal. Additionally, the secondary Node activates the user plane security protection method between the secondary Node and the user terminal using the user plane security protection method between the secondary Node and the user terminal, the security algorithm between the secondary Node and the user terminal, and the security key between the secondary Node and the user terminal.

In a possible implementation, the user plane security policy is a first user plane security policy of the user terminal. To be more specific, when obtaining the first user plane security policy of the user terminal, the master Node directly sends the first user plane security policy to the secondary Node. The secondary Node generates a third user plane security policy according to the first user plane security policy, and determines the user plane security protection method between the secondary Node and the user terminal according to the third user plane security policy. The third user plane security policy is a mapped user plane security policy generated by the secondary Node.

The secondary Node may generate the third user plane security policy based on a capability of the secondary Node, a capability of the master Node, and the first user plane security policy.

In a possible implementation, the secondary Node sends the third user plane security policy generated by the secondary Node to the master Node, such that the master Node learns of the user plane security protection method between the secondary Node and the user terminal.

In a possible implementation, the user plane security policy is a second user plane security policy, which is a mapped user plane security policy generated by the master Node according to the first user plane security policy of the user terminal. Additionally, the secondary Node determines the user plane security protection method between the secondary Node and the user terminal according to the second user plane security policy.

In a possible implementation, the secondary Node receives first uplink user plane data and second uplink user plane data from the master Node and the user terminal, respectively, where the first uplink user plane data and the second user plane data are user plane data obtained after the user terminal performs security protection according to the user plane security protection method between the user terminal and the secondary Node. Additionally, the secondary Node performs security deprotection on the first uplink user plane data and the second user plane data, to obtain user plane data after security deprotection, and sends the user plane data after security deprotection to a user plane network element, to implement user plane security protection between the user terminal and the secondary Node.

A sixth aspect of the embodiments of this application provides a secondary Node. The secondary Node has a function of implementing the method provided in the fifth aspect. The function may be implemented by hardware, or implemented by hardware executing corresponding software. The hardware or the software includes one or more modules corresponding to the foregoing function.

In a possible implementation, the secondary Node includes a transceiver unit and a processing unit, where the transceiver unit is configured to receive a first message from a master Node, where the first message includes a user plane security policy. The processing unit is configured to: determine a user plane security protection method between the secondary Node and a user terminal according to the user plane security policy; and activate the user plane security protection method between the secondary Node and the user terminal. The transceiver unit is further configured to send a second message to the master Node, where the second message includes user plane security enabling type indication information, and the user plane security enabling type indication information is used to indicate the user plane security protection method between the secondary Node and the user terminal.

In a possible implementation, the secondary Node includes: a processor, a transceiver, and a memory. The memory stores a computer program, the computer program includes a program instruction, and the processor is configured to invoke program code to perform the following operations: receiving a first message from a master Node, where the first message includes a user plane security policy; determining a user plane security protection method between the secondary Node and the user terminal according to the user plane security policy, and activating the user plane security protection method between the secondary Node and the user terminal; and sending a second message to the master Node, where the second message includes user plane security enabling type indication information, and the user plane security enabling type indication information is used to indicate the user plane security protection method between the secondary Node and the user terminal.

Based on a same concept, for a problem-resolving principle and beneficial effects of the secondary Node, refer to the method and beneficial effects brought by the method in the fifth aspect. Therefore, for implementation of the apparatus, refer to implementation of the method. Repeated content is not described again.

A seventh aspect of the embodiments of this application provides a computer-readable storage medium. The computer-readable storage medium stores an instruction, and when the instruction is run on a computer, the computer is enabled to perform the method according to the fifth aspect.

An eighth aspect of the embodiments of this application provides a computer program product including an instruction. When the instruction is run on a computer, the computer is enabled to perform the method according to the fifth aspect.

A ninth aspect of the embodiments of this application provides a method for dual-connectivity communication, including: receiving, by a user terminal, a third message from a master Node, where the third message includes user plane security enabling type indication information and a security algorithm that is selected by a secondary Node, and the user plane security enabling type indication information is used to indicate a user plane security protection method between the secondary Node and the user terminal; activating, by the user terminal, the user plane security protection method between the user terminal and the secondary Node according to the user plane security enabling type indication information and the security algorithm that is selected by the secondary Node; and performing, by the user terminal, security protection on uplink user plane data according to the user plane security protection method between the user terminal and the secondary Node.

According to the ninth aspect of the embodiments of this application, the user terminal receives, from the master Node, the user plane security enabling type indication information and the security algorithm that is selected by the secondary Node, to learn of the user plane security protection method between the user terminal and the secondary Node and the security algorithm between the user terminal and the secondary Node. Additionally, the user terminal activates the user plane security protection method between the user terminal and the secondary Node, to enable user plane security protection between the user terminal and the secondary Node, thereby ensuring confidentiality and integrity of user plane data transmission in a 5G dual connectivity scenario.

In a possible implementation, the user terminal generates a security key between the user terminal and the secondary Node. Additionally, the user terminal activates the user plane security protection method between the user terminal and the secondary Node according to the user plane security enabling type indication information and the security algorithm that is selected by the secondary Node and based on the security key between the user terminal and the secondary Node.

In a possible implementation, performing, by the user terminal, security protection on uplink user plane data according to the user plane security protection method between the user terminal and the secondary Node includes sending, by the user terminal, first uplink user plane data and second uplink user plane data to the secondary Node and the master Node respectively. The first uplink user plane data and the second user plane data are user plane data obtained after the user terminal performs security protection according to the user plane security protection method between the user terminal and the secondary Node.

A tenth aspect of the embodiments of this application provides a user terminal. The user terminal has a function of implementing the method provided in the ninth aspect. The function may be implemented by hardware, or implemented by hardware executing corresponding software. The hardware or the software includes one or more modules corresponding to the foregoing function.

In a possible implementation, the user terminal includes a transceiver unit and a processing unit, where the transceiver unit is configured to receive a third message from a master Node, where the third message includes user plane security enabling type indication information and a security algorithm that is selected by a secondary Node, and the user plane security enabling type indication information is used to indicate a user plane security protection method between the secondary Node and the user terminal. The processing unit is configured to: activate the user plane security protection method between the user terminal and the secondary Node according to the user plane security enabling type indication information and the security algorithm that is selected by the secondary Node; and perform security protection on uplink user plane data according to the user plane security protection method between the user terminal and the secondary Node.

In a possible implementation, the user terminal includes: a processor, a transceiver, and a memory. The memory stores a computer program, the computer program includes a program instruction, and the processor is configured to invoke program code, to perform the following operations: receiving a third message from a master Node, where the third message includes user plane security enabling type indication information and a security algorithm that is selected by the secondary Node, and the user plane security enabling type indication information is used to indicate a user plane security protection method between the secondary Node and the user terminal; activating the user plane security protection method between the user terminal and the secondary Node according to the user plane security enabling type indication information and the security algorithm that is selected by the secondary Node; and performing security protection on uplink user plane data according to the user plane security protection method between the user terminal and the secondary Node.

Based on a same concept, for a problem-resolving principle and beneficial effects of the user terminal, refer to the method and beneficial effects brought by the method in the ninth aspect. Therefore, for implementation of the apparatus, refer to implementation of the method. Repeated content is not described again.

An eleventh aspect of the embodiments of this application provides a computer-readable storage medium. The computer-readable storage medium stores an instruction, and when the instruction is run on a computer, the computer is enabled to perform the method according to the ninth aspect.

A twelfth aspect of the embodiments of this application provides a computer program product including an instruction. When the computer program product is run on a computer, the computer is enabled to perform the method according to the ninth aspect.

A thirteenth aspect of the embodiments of this application provides a system for dual-connectivity communication, including a master Node and a secondary Node, where the master Node is configured to send a first message to the secondary Node, where the first message includes a user plane security policy. The secondary Node is configured to: receive the first message sent by the master Node, and determine a user plane security protection method between the secondary Node and a user terminal according to the user plane security policy; and send a second message to the master Node, where the second message includes user plane security enabling type indication information, and the user plane security enabling type indication information is used to indicate the user plane security protection method between the secondary Node and the user terminal. The master Node is further configured to: receive the second message sent by the secondary Node; and send a third message to the user terminal, where the third message includes the user plane security enabling type indication information.

In the system for dual-connectivity communication provided in the thirteenth aspect of the embodiments of this application, the user plane security protection between the user terminal and the secondary Node may be enabled, thereby ensuring confidentiality and integrity of user plane data transmission in a 5G dual connectivity scenario.

In a possible implementation, the system further includes the user terminal, where the user terminal is configured to receive the third message from the master Node, where the third message includes the user plane security enabling type indication information and a security algorithm that is selected by the secondary Node. Additionally, the user plane security enabling type indication information is used to indicate a user plane security protection method between the secondary Node and the user terminal. The user terminal is further configured to: activate the user plane security protection method between the user terminal and the secondary Node according to the user plane security enabling type indication information and the security algorithm that is selected by the secondary Node; and perform security protection on uplink user plane data according to the user plane security protection method between the user terminal and the secondary Node.

In a possible implementation, when the secondary Node does not support user plane integrity protection, the master Node is further configured to determine that user plane integrity protection indication information in the user plane security policy is "not needed".

In a possible implementation, the master Node is further configured to: obtain an original user plane security policy of the user terminal; and generate a mapped user plane security policy according to the original user plane security policy, where the user plane security policy included in the first message is the mapped user plane security policy of the master Node.

In a possible implementation, the user plane security policy included in the first message is a mapped user plane security policy generated by the master Node according to the first user plane security policy.

In a possible implementation, the system further includes a user plane network element. The master Node is further configured to: receive first uplink user plane data sent by the user terminal; and send the first uplink user plane data to the secondary Node. The secondary Node is further configured to: receive second uplink user plane data sent by the user terminal and the first uplink user plane data sent by the master Node; perform security deprotection on the first uplink user plane data and the second user plane data, to obtain user plane data after security deprotection; and send the user plane data after security deprotection to the user plane network element, where the first uplink user plane data and the second user plane data are user plane data obtained after the user terminal performs security protection according to the user plane security protection method between the user terminal and the secondary Node.

In a possible implementation, the system further includes an access management network element. The master Node is further configured to send a third user plane security policy to the access management network element, where the third user plane security policy is a mapped user plane security policy generated by the secondary Node. Alternatively, the third user plane security policy is a user plane security policy determined by the master Node according to the user plane security enabling type indication information.

BRIEF DESCRIPTION OF DRAWINGS

To describe the technical solutions in the embodiments of this application or in the background more clearly, the following briefly describes the accompanying drawings required for describing the embodiments of this application or the background.

DESCRIPTION OF EMBODIMENTS

Figure 1:
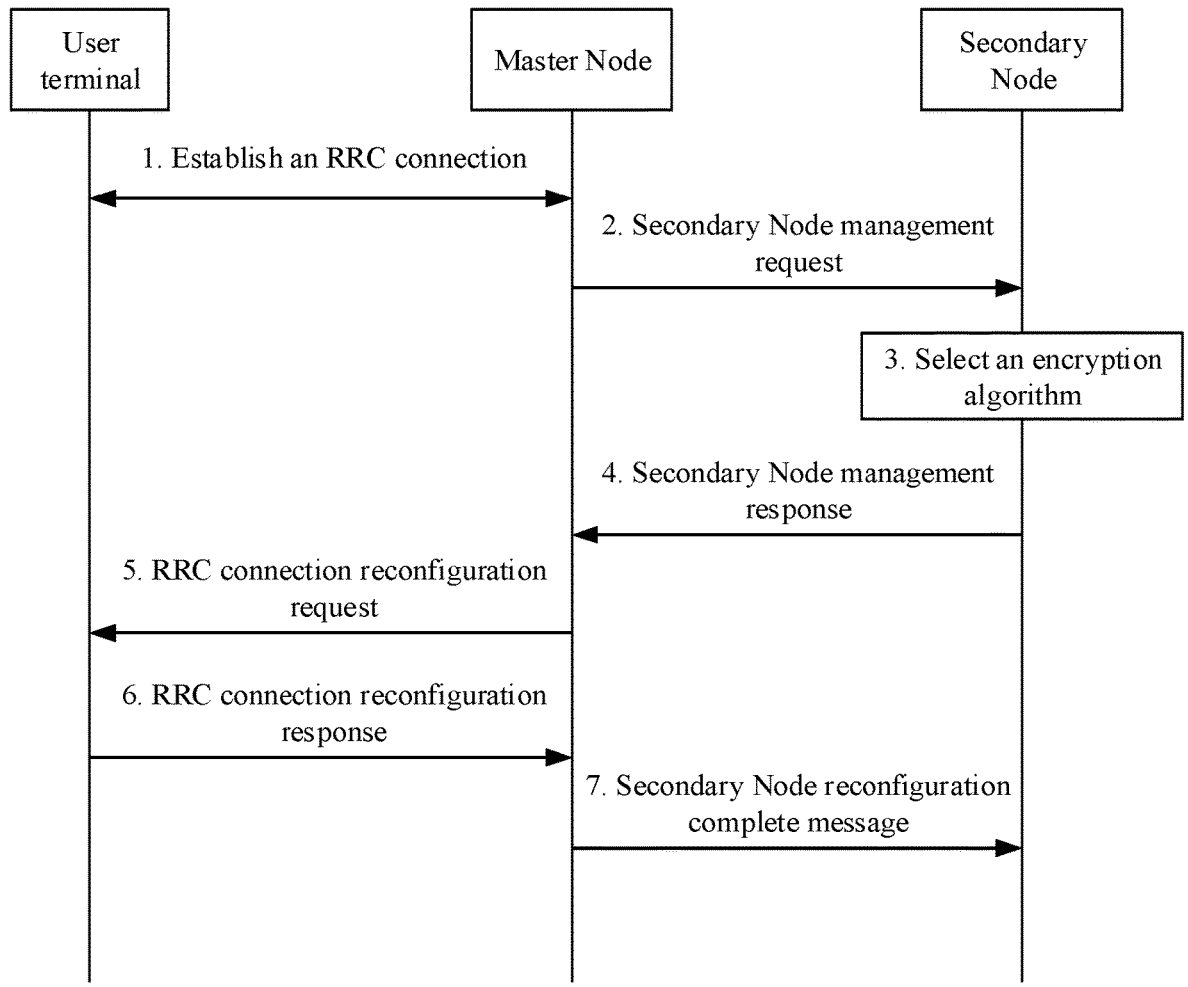
FIG. 1 is a schematic flowchart of LTE dual-connectivity communication.

The following describes the technical solutions in the embodiments of this application with reference to the accompanying drawings in the embodiments of this application. In descriptions of this application, "/" represents an "or" relationship between associated objects unless otherwise specified. For example, AB may represent A or B. The term "and/or" in this application describes only an association relationship for describing associated objects and represents that three relationships may exist. For example, A and/or B may represent the following three cases: Only A exists, both A and B exist, and only B exists, where A and B may be singular or plural. In addition, in the descriptions of this application, "a plurality of" means two or more than two. "At least one (one piece) of the following" or a similar expression thereof refers to any combination of these items, including any combination of singular items (pieces) or plural items (pieces). For example, at least one (piece) of a, b, or c may represent a, b, c, a-b, a-c, b-c, or a-b-c, where a, b, and c may be in a singular or plural form. In addition, to clearly describe the technical solutions in the embodiments of this application, terms such as "first" and "second" are used in the embodiments of this application to distinguish between same items or similar items that have basically the same functions or purposes. A person skilled in the art may understand that the terms such as "first" and "second" do not limit a quantity or an execution sequence, and that the terms such as "first" and "second" do not indicate a definite difference.

In addition, the network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

The following describes names or terms used in the embodiments of this application.

Master Node (MN): In a dual connectivity scenario, a base station or evolved Node B (eNB) that initiates dual connectivity is referred to as a master Node, or may be referred to as a master network node, a first base station, or a first network node.

Secondary Node (SN): In a dual connectivity scenario, another base station or eNB that is selected by a master Node and that collaboratively serves a user terminal is referred to as a secondary Node, and may also be referred to as a slave base station, a secondary network node, a slave network node, a second base station, or a second network node.

User plane security policy: A user plane security policy includes user plane encrypted protection indication information and user plane integrity protection indication information. The user plane encrypted protection indication information is used to indicate three possible values, respectively: not needed, preferred, and required. The user plane integrity protection indication information is used to indicate three possible values, respectively: not needed, preferred, and required, where "not needed" indicates that activation is not needed, "preferred" indicates that activation may be or may not be performed, and "required" indicates that activation is required. The foregoing three possible values may be each indicated using two bits. For example, 00 indicates that activation is not needed, 01 indicates that activation may be or may not be performed, and 11 indicates that activation is required. A specific manner in which the user plane encrypted protection indication information and the user plane integrity protection indication information indicate the three possible values is not limited in the embodiments of this application.

User plane encrypted protection protects confidentiality of data in a transmission process (and therefore may also be referred to as user plane confidentiality protection), and user plane integrity protection protects integrity of data in a transmission process. The confidentiality means that real content cannot be directly learned of, and the integrity means that the data is original and is not tampered with.

User plane security protection method: A user plane security protection method refers to whether user plane encrypted protection on a user terminal side, a master Node side, or a secondary Node side is enabled and whether user plane integrity protection is enabled. For example, a secondary Node may determine a user plane security protection method of the secondary Node with reference to a user plane security policy and a user plane security protection method that is configured on the secondary Node. It is assumed that the user plane security protection method configured on the secondary Node is enabling user plane encrypted protection and disabling user plane integrity protection. If user plane encrypted protection indication information included in the user plane security policy is "required", the user plane encrypted protection is enabled, and the secondary Node determines that the user plane security protection method of the secondary Node is enabling the user plane encrypted protection and disabling the user plane integrity protection. If user plane encrypted protection indication information included in user plane security policy is "not needed", the user plane encrypted protection is not enabled, and the secondary Node determines that the user plane security protection method of the secondary Node is disabling the user plane encrypted protection and disabling the user plane integrity protection. If user plane encrypted protection indication information included in the user plane security policy is "preferred", the secondary Node determines, based on some conditions, whether to enable the user plane encrypted protection. For example, the secondary Node may enable the user plane encrypted protection when the secondary Node has a sufficient resource.

User plane security enabling type indication information: User plane security enabling type indication information is used by a base station side to indicate whether user plane encrypted protection on a terminal side is enabled and whether user plane integrity protection is enabled, for example, used to indicate that the user plane encrypted protection is enabled and the user plane integrity protection is disabled. The user plane security enabling type indication information may be indicated by two bits. One bit indicates whether the encrypted protection is enabled or disabled, and the other bit indicates whether the integrity protection is enabled or disabled.

Security algorithm(s): Security algorithms may include a security algorithm used by a user plane and a security algorithm used by a signaling plane. The security algorithm used by the user plane is used to protect user plane data, and may include a user plane encryption algorithm and a user plane integrity algorithm. The security algorithm used by the signaling plane is used to protect signaling, and may include a signaling plane encryption algorithm and a signaling plane integrity algorithm. The security algorithm used by the user plane and the security algorithm used by the signaling plane may be the same or may be different. An example meaning of being the same is that, if the user plane integrity protection is enabled, an integrity algorithm used by the user plane is the same as an integrity algorithm used by the signaling plane. Alternatively, if the user plane encrypted protection is enabled, an encryption algorithm used by the user plane is the same as an encryption algorithm used by the signaling plane. The security algorithm used by the signaling plane is different from the security algorithm used by the user plane provided that the security algorithms include different algorithms. For example, an encryption algorithm used by the user plane is an encryption algorithm A, an encryption algorithm used by the signaling plane is an encryption algorithm B, and both the user plane and the signaling plane use an integrity algorithm C. In this case, the security algorithm used by the user plane is different from the security algorithm used by the signaling plane.

Security key(s): A security key may include a key for protecting user plane data and a key for protecting a signaling plane data. The key for protecting user plane data is used to protect the user plane data, and may include a user plane encryption key and a user plane integrity protection key. The key for protecting a signaling plane data is used to protect signaling, for example, may be a key for protecting RRC signaling. The key for protecting RRC signaling may include an integrity protection key and an encryption key for protecting RRC signaling.

Security protection: For a node that performs a security function, a user plane/signaling plane security algorithm and a key for protecting user plane/signaling plane data are used together to protect user plane data. For example, encrypted protection is performed on the user plane/signaling plane data using an encryption key and an encryption algorithm. Integrity protection is performed on the user plane/signaling plane data using an integrity protection key and an integrity protection algorithm. A sequential relationship between the encrypted protection and the integrity protection is not limited in the embodiments of the present disclosure. To be more specific, the encrypted protection may be first performed on the user plane/signaling plane data, and then the integrity protection is performed. Alternatively, the integrity protection may be first performed on a user plane/signaling plane data, and then the encrypted protection is performed on the user plane/signaling plane data. Certainly, the user plane and the signaling plane may not use a same execution sequence.

Security deprotection: For a node that performs a security function, a user plane/signaling plane security algorithm and a key for protecting user plane/signaling plane data are used together to obtain original user plane data. For example, encrypted user plane/signaling plane data is decrypted using an encryption key and an encryption algorithm. Integrity protection verification is performed on the user plane data using an integrity protection key and an integrity protection algorithm. A sequence of the decryption and the integrity protection verification is not limited in the embodiments of the present disclosure. However, it should be understood that, if encrypted protection is first performed and then integrity protection is performed on the user plane/signaling plane data, in security deprotection, the integrity protection is first verified, and then the encrypted user plane data is decrypted. Alternatively, if integrity protection is first performed on the user plane/signaling plane data, and then the user plane/signaling plane data is encrypted, a sequence of the security deprotection is first decrypting the encrypted data, and then performing integrity protection verification.

Activating a user plane/signaling plane security protection method means that, if a user plane/signaling plane security protection method is determined, the user plane/signaling plane security protection method is activated using a user plane/signaling plane security algorithm and a key for protecting user plane/signaling plane data. That is, security protection is performed on to-be-transmitted user plane/signaling plane data using the user plane/signaling plane security protection method, the user plane/signaling plane security algorithm, and the key for protecting user plane/signaling plane data. For example, if a determined user plane security protection method enabling user plane encrypted protection and disabling user plane integrity protection, a user plane encryption algorithm is an encryption algorithm A, and a user plane encryption key is a key K, for to-be-transmitted user plane data, user plane encrypted protection is performed on the user plane data using the encryption algorithm A and the key K. An effect that can be achieved by activating a user plane security protection method is that, after a node that performs user plane security protection is activated, security protection may start to be performed on user plane data and security deprotection may start to be performed on user plane data. It should be understood that the two actions, namely, the security protection and the security deprotection, may be further separately activated. For example, after a base station sends a security activation message, the base station activates security deprotection. After the base station receives a security activation acknowledgement message, the base station activates security protection.

FIG. 1 is a schematic flowchart of LTE dual-connectivity communication. A procedure may include the following steps.

Step 1: A user terminal establishes an RRC connection to a master Node.

Step 2: The master Node determines to start dual connectivity, and sends a secondary Node management request to a secondary Node.

The master Node calculates an S-KeNB using a KeNB. The KeNB is a root key shared by the master Node and the user terminal. The user terminal and the master Node may calculate the S-KeNB based on the KeNB, and generate a key for protecting RRC signaling and a key for protecting user plane data that are between the user terminal and the master Node. The S-KeNB is a root key between the secondary Node and the user terminal, and the user terminal and the secondary Node may generate, based on the S-KeNB, a key that is for protecting user plane data and that is between the user terminal and the secondary Node. The key for protecting RRC signaling may be, for example, an integrity key of an RRC signaling plane or an encryption key of an RRC signaling plane. The key for protecting user plane data may be, for example, a user plane encryption key.

If the master Node determines to start the dual connectivity, the master Node sends the secondary Node management request to the secondary Node to start the dual connectivity. The secondary Node management request may be a secondary Node addition request, or may be a secondary Node modification request. The secondary Node management request includes the S-KeNB and a security capability of the user terminal, The security capability of the user terminal includes a security algorithm supported by the user terminal, to be more specific, encryption algorithms and integrity protection algorithms that are supported by the user terminal. The secondary Node management request includes the S-KeNB, such that the secondary Node generates, based on the S-KeNB, a key for protecting user plane data.

Step 3: The secondary Node selects an encryption algorithm, where the selected encryption algorithm and the key that is for protecting user plane data and that is generated based on the S-KeNB together protect user plane data transmission between the user terminal and the secondary Node.

Step 4: The secondary Node sends a secondary Node management response to the master Node, where the secondary Node management response includes the encryption algorithm selected by the secondary Node.

The secondary Node management response is used to respond to the secondary Node management request. If the secondary Node management request is a secondary Node addition request, the secondary Node management response is a secondary Node addition response. If the secondary Node management request is a secondary Node modification request, the secondary Node management response is a secondary Node modification response.

Step 5: The master Node sends an RRC connection reconfiguration request to the user terminal, where the RRC connection reconfiguration request includes a secondary cell group (SCG) counter and the encryption algorithm selected by the secondary Node. The SCG counter is used by the user terminal to generate an S-KeNB. The S-KeNB is the same as the S-KeNB calculated by the master Node. The user terminal may generate, based on the S-KeNB, a key for protecting user plane data. Because the S-KeNB is the same as the S-KeNB calculated by the master Node, the key that is for protecting user plane data and that is generated by the user terminal is the same as the key that is for protecting user plane data and that is generated by the secondary Node. As such, the user terminal and the secondary Node protect user plane data using the same key.

Step 6: The user terminal sends an RRC connection reconfiguration response to the master Node.

Step 7: The master Node sends a secondary Node reconfiguration complete message to the secondary Node.

In the foregoing procedure, the master Node notifies the secondary Node of the S-KeNB determined by the master Node, such that the secondary Node protects, using the selected encryption algorithm and the key that is for protecting user plane data and is generated based on the S-KeNB, the user plane data transmitted between the user terminal and the secondary Node. Additionally, the user terminal protects, using the same encryption algorithm and the same key for protecting user plane data, the user plane data transmitted between the user terminal and the secondary Node, thereby implementing user plane encrypted protection between the user terminal and the secondary Node.

However, in the foregoing procedure, there is only the encrypted protection and there is no user plane integrity protection newly introduced by 5G, and currently only user plane integrity protection in a 5G single connection scenario is provided. Therefore, in a 5G dual connectivity scenario, how to enable the user plane encrypted protection and the user plane integrity protection between the user terminal and the secondary Node is a technical problem to be urgently resolved. That is, how to enable user plane security between the user terminal and the secondary Node is a technical problem to be urgently resolved.

In view of this, the embodiments of this application provide a method and an apparatus for dual-connectivity communication, to resolve a technical problem of how to enable the user plane security between the user terminal and the secondary Node in the 5G dual connectivity scenario, thereby ensuring confidentiality and integrity of user plane data transmission in the 5G dual connectivity scenario. The method and the apparatus for dual-connectivity communication provided in the embodiments of this application can also resolve a technical problem of how to enable user plane security between the user terminal and the master Node and between the user terminal and the secondary Node in the 5G dual connectivity scenario.

Figure 2:
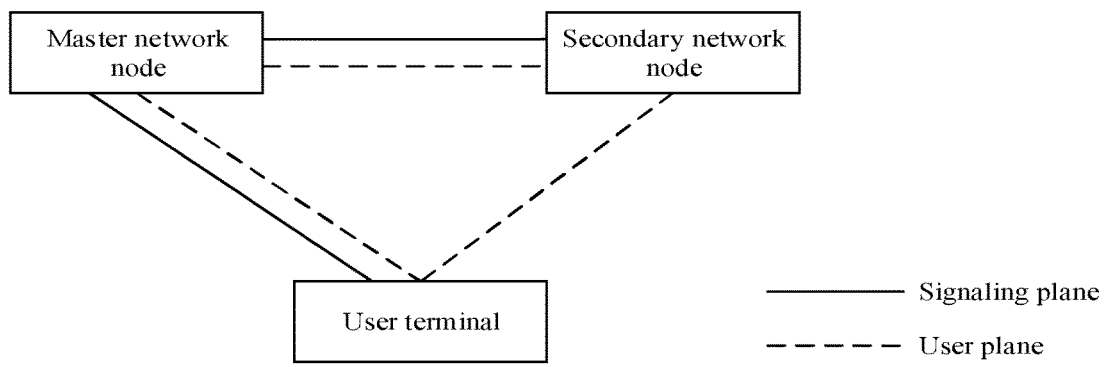
FIG. 2 is a schematic diagram of a network architecture to which an embodiment of this application is applied.

FIG. 2 is a schematic diagram of a network architecture to which an embodiment of this application is applied. The schematic diagram of the network architecture is a schematic diagram of a dual connectivity network architecture, including a master Node, a secondary Node, and a user terminal. In the schematic diagram of the network architecture shown in FIG. 2, a black solid line indicates a signaling plane data transmission path, and a black dashed line indicates a user plane data transmission path. It can be learned from FIG. 2 that, between the user terminal and the secondary Node, no signaling plane message is transmitted, and only a user plane message is transmitted using the secondary Node. For this architecture, it is not excluded that, with evolution of standardization, a signaling plane message is transmitted between the user terminal and the secondary Node. In other words, it is not excluded that, in the future, for a signaling plane message between the user terminal and the secondary Node, there are security-related procedures (such as security negotiation and security activation) that can be performed only using the master Node in other approaches.

The master Node is a base station that initiates dual connectivity, and may be a next generation Node Basestation (gNB) in a 5G network, or may be an evolved Node Basestation (eNB or eNodeB) in an LTE network, or may be an upgraded eNB, namely, a next generation (NG) evolved Node Basestation (ng-eNB), or may be a base station in a future communications system. The master Node is connected to a core network element. For example, the master Node is connected to a mobility management network element. The mobility management network element may be a mobility management entity (MME) in a 4th generation (4G) core network, or may be an access and mobility management function (AMF) in a 5G core network, or may be a network element that is in a future core network and that has a function the same as that of an MME or an AMF. For another example, the master Node is connected to a user plane network element, to transmit user plane data. The user plane network element may be a serving gateway (SGW) in the 4G core network, or may be a user plane function (UPF) in the 5G core network, or may be a network element that is in the future core network and that has a function the same as that of an SGW or a UPF.

The secondary Node is another base station that is selected by the master Node and that collaboratively serves the user terminal. For example, the secondary Node may be an eNB, or may be a gNB, or may be an ng-eNB, or may be a base station in the future communications system. In a 4G dual connectivity scenario, to be more specific, in a scenario in which two network nodes connected to the user terminal are eNBs, a secondary Node usually has a direct X2 interface only with a master Node, and in a special case, the secondary Node may have a direct interface with an MME and an SGW. In a 5G dual connectivity scenario, to be more specific, in a scenario in which at least one of two network nodes connected to the user terminal is a gNB, a secondary Node has a direct interface with a master Node, the secondary Node may have a direct interface with a UPF, and in a special case, the secondary Node may have a direct interface with an AMF.

The user terminal used in this embodiment of this application may include various handheld devices, vehicle-mounted devices, wearable devices, or computing devices that have a wireless communication function, or other processing devices connected to a wireless modem. Alternatively, the user terminal may include a user equipment, a subscriber unit, a cellular phone, a smartphone, a wireless data card, a personal digital assistant (PDA) computer, a tablet computer, a wireless modem, a handheld device, a laptop computer, a cordless phone, a wireless local loop (WLL) station, a machine type communication (MTC) terminal, the UE, a mobile station (MS), a terminal device, relay user equipment, or the like. The relay user equipment may be, for example, a 5G residential gateway (RG). For ease of description, the devices mentioned above are collectively referred to as a user terminal in the embodiments of this application.

The user terminal stores a long-term key and a related function. When performing two-way authentication with the core network element (for example, an AMF or an authentication server function (AUSF)), the user terminal verifies authenticity of a network using the long-term key and the related function.

Figure 3A:
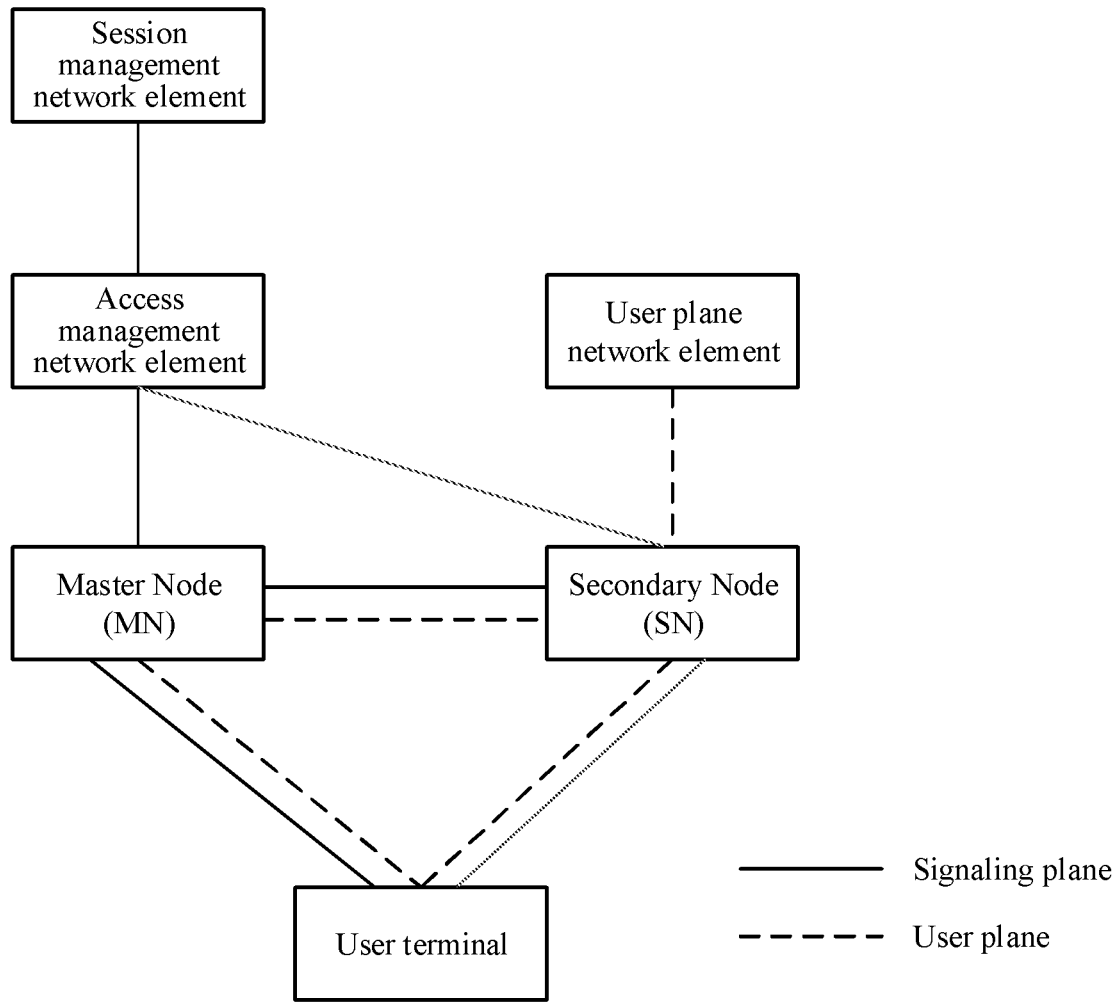
FIG. 3A is a schematic diagram of a 5G dual connectivity architecture to which an embodiment of this application is applied.
Figure 3B:
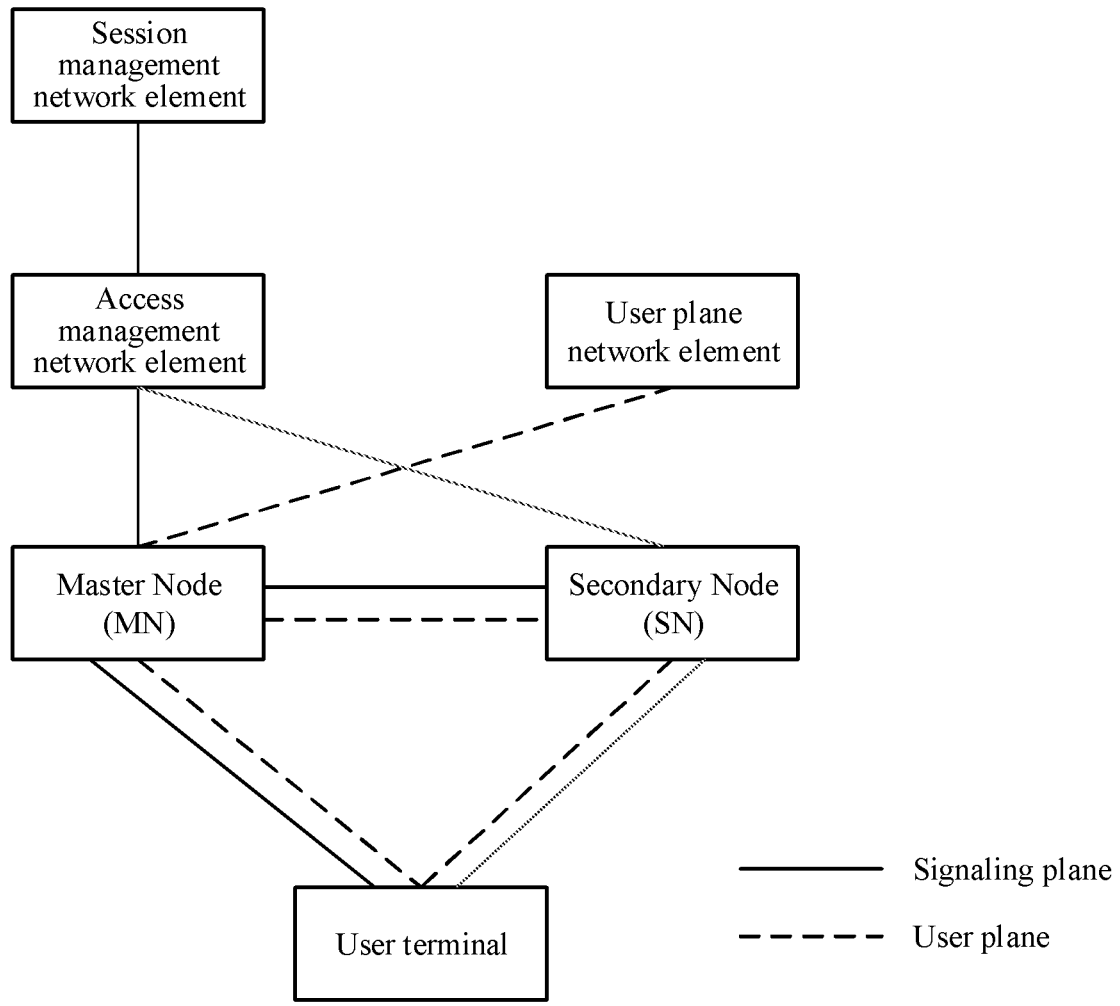
FIG. 3B is another schematic diagram of a 5G dual connectivity architecture to which an embodiment of this application is applied.

FIG. 3A and FIG. 3B are schematic diagrams of two 5G dual connectivity architectures to which embodiments of this application are applied. In FIG. 3A and FIG. 3B, a master Node is a gNB, and a secondary Node is an ng-eNB; a master Node is an ng-eNB, and a secondary Node is a gNB; a master Node is a gNB, and a secondary Node is a gNB; or the like. A case in which the secondary Node is an ng-eNB or a gNB is mainly described in this embodiment of this application. The schematic diagrams of 5G dual connectivity architectures shown in FIG. 3A and FIG. 3B do not constitute a limitation to the embodiments of this application.

In FIG. 3A and FIG. 3B, an access management network element is responsible for mobility management, and may be an AMF in a 5G core network, or may be a network element that is in a future core network and that is responsible for mobility management. In the embodiments of this application, an AMF is used as an example of an access management network element for description. A user plane network element is a user plane data egress, is connected to an external network (for example, a data network (DN)), and may be a UPF in the 5G core network, or may be a network element that is in the future core network, that serves as a user plane data egress, and that is connected to an external network. In the embodiments of this application, a UPF is used as an example of the user plane network element for description. A session management network element is configured to allocate a session resource to a user plane, and may be a session management function (SMF) in the 5G core network, or may be a network element that is in the future core network and that allocates a session resource to a user plane. In the embodiments of this application, an SMF is used as an example of the session management network element for description.

In FIG. 3A and FIG. 3B, in a special case, a signaling plane path may exist between the secondary Node and the core network element, and a signaling plane path may exist between the secondary Node and the user terminal. Refer to gray solid lines shown in FIG. 3a and FIG. 3b.

A difference between FIG. 3A and FIG. 3B lies in that, in FIG. 3A, a user plane security termination point is on the secondary Node (SN), and the SN exchanges user plane data with the user plane network element. However, in FIG. 3B, a user plane security termination point is on the master Node (MN), and the MN exchanges user plane data with the user plane network element.

A base station on which a user plane security termination point is located performs security protection/security deprotection on user plane data. For example, the user plane security termination point is on the SN, and the SN performs security protection on the user plane data. For uplink user plane data, a UE performs security protection on the uplink user plane data according to a user plane security protection method between the UE and the SN, and sends uplink user plane data after security protection to the SN through two connections. Through one connection, uplink user plane data after security protection is directly sent to the SN, and through the other connection, uplink user plane data after security protection is sent to the SN using the MN (i.e., the MN transparently transmits, to the SN, the uplink user plane after security protection sent by the UE). When the SN receives the uplink user plane data after security protection, the SN performs security deprotection on the uplink user plane data according to the user plane security protection method between the SN and the UE. For downlink user plane data, the SN performs security protection on the downlink user plane data according to a user plane security protection method between the SN and the UE, and sends downlink user plane data after security protection to the UE through two connections. Through one connection, downlink user plane data after security protection is directly sent to the UE, and through the other connection, downlink user plane data after security protection is sent to the UE using the MN. When the UE receives the downlink user plane data after security protection, the UE performs security deprotection on the downlink user plane data according to the user plane security protection method between the UE and the SN. It should be understood that the two connections do not necessarily exist at the same time. When the user plane security termination point is on the SN, the SN may send all encrypted data to the UE using the MN. For example, after resource utilization of the SN reaches a threshold, the SN sends all messages to the UE using the MN.

The following describes in detail a method for dual-connectivity communication provided in embodiments of this application.

It should be noted that names of messages between network elements in the following embodiment of this application, names of parameters in the messages, or the like are merely examples, and there may be other names during implementation. This is not specifically limited in this embodiment of this application.

Figure 4A:
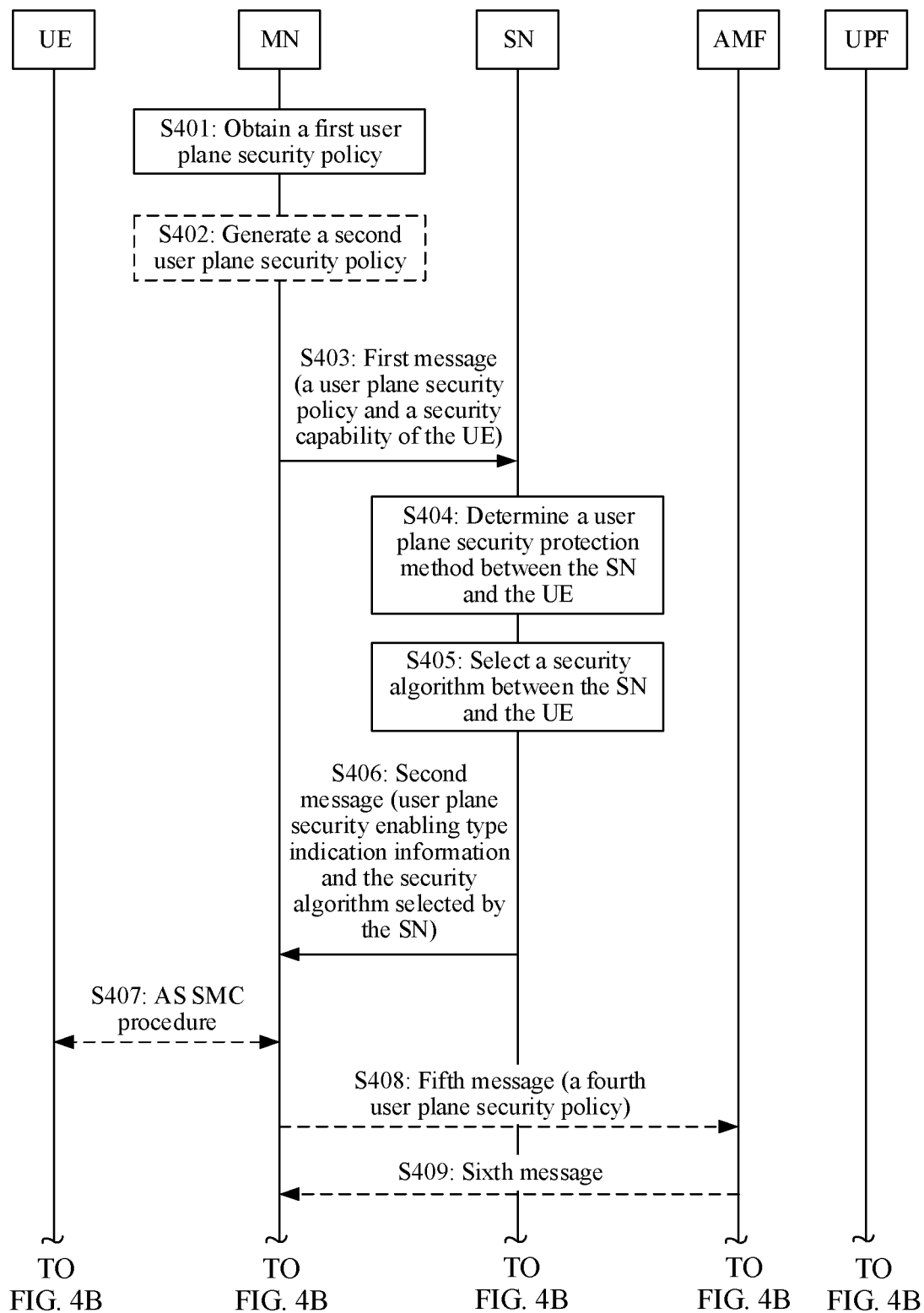
FIG. 4A and FIG. 4B are schematic flowcharts of a method for dual-connectivity communication according to a first embodiment of this application.
Figure 4B:
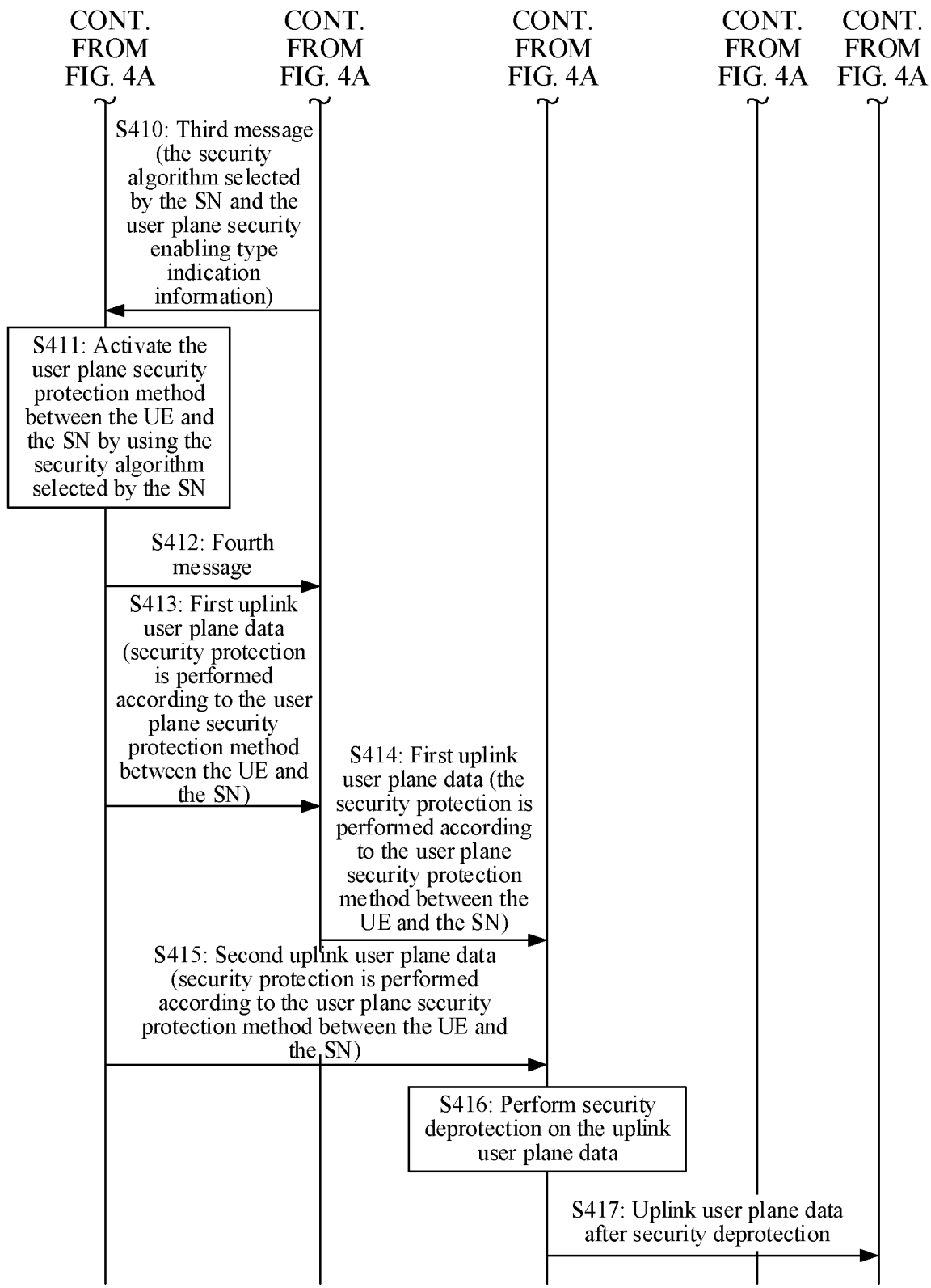

Using an example in which an embodiment of this application is applied to the schematic diagram of the dual connectivity network architecture shown in FIG. 3A, FIG. 4A and FIG. 4B are schematic flowcharts of a method for dual-connectivity communication according to a first embodiment of this application. In this embodiment, a UE is used as an example of a user terminal, an AMF is used as an example of an access management network element, an SMF is used as an example of a session management network element, and a UPF is used as an example of a user plane network element for description. The method may include but is not limited to the following steps.

Step S401: An MN obtains a first user plane security policy.

The first user plane security policy is an original user plane security policy. "Original" is relative to "mapped", and "mapped" may be obtained by processing "original".

Optionally, the embodiment shown in FIG. 4A and FIG. 4B further includes a packet data unit (PDU) session establishment process. The PDU session establishment process may include: The UE sends a PDU session establishment request to the AMF using the MN; when receiving the PDU session establishment request, the AMF sends session-establishment-request-related content in the PDU session establishment request to the SMF; when receiving the session-establishment-request-related content, the SMF may obtain session-related subscription information from a unified data management (UDM), and the SMF may obtain a user plane security policy from the session-related subscription information, or the SMF obtains a user plane security policy from local configuration information of the SMF; and the SMF sends a PDU session establishment complete message to the UE using the AMF and the MN. The PDU session establishment complete message includes the user plane security policy.

The user plane security policy obtained by the SW is a user plane security policy of the UE, and may be a user plane security policy of a PDU session of the UE. For different PDU sessions, user plane security policies are different, and may be distinguished using PDU session identifiers. The user plane security policy of the UE may correspond to the PDU session, or may correspond to another granularity, for example, correspond to a network slice identifier, corresponding to a quality of service (QoS) flow identifier (QFI), correspond to a 5G quality of service flow identifier (5QI), or correspond to a data radio bearer (DRB) identifier (DRB ID).

The MN may initiate a dual connectivity procedure after the PDU session establishment is completed, or may initiate a dual connectivity procedure in the PDU session establishment process. If the MN initiates a dual connectivity procedure after the PDU session establishment is completed, step S401 may be performed after the PDU session establishment is completed. If the MN initiates a dual connectivity procedure in the PDU session establishment process, the SW sends a PDU session establishment complete message to the MN using the AMF, and when receiving an RRC connection reconfiguration response from the UE, the MN sends the PDU session establishment complete message to the UE.

The MN may obtain the first user plane security policy by receiving the PDU session establishment complete message from the SMF, in other words, use, as the first user plane security policy, a user plane security policy carried in the PDU session establishment complete message.

Alternatively, the MN may send, to the SW using the AMF, a request for obtaining session-related subscription information. When receiving the request, the SMF requests to obtain session-related subscription information from the UDM. When the SW receives a response from the UDM and the session-related subscription information includes the user plane security policy, the SW may obtain the user plane security policy from the session-related subscription information. Alternatively, the SMF obtains the user plane security policy from the local configuration information of the SW. Then, the SW sends the obtained user plane security policy to the MN using the AMF. When receiving the user plane security policy, the MN uses the user plane security policy as the first user plane security policy.

When the MN serves as a target base station in a base station handover process, the MN may use, as the first user plane security policy, a user plane security policy sent by a source base station or sent by the AMF.

Optionally, after step S401, the method further includes step S402: The MN generates a second user plane security policy.

The second user plane security policy is a mapped user plane security policy.

Further, the second user plane security policy does not include a case of "preferred". To be more specific, user plane encrypted protection indication information is "required" or "not needed", and user plane encrypted protection is "required" or "not needed".

The MN may generate the second user plane security policy according to the first user plane security policy and with reference to content such as a capability of the SN and current status information of the UE. The capability of the SN may include one or more of the following: whether the SN supports enabling of user plane encrypted protection and whether the SN supports enabling of user plane integrity protection; a resource of the SN; configuration information of the SN; a security algorithm supported by the SN; and the like. For the configuration information of the SN, for example, when the SN is an ng-eNB, the configuration information of the SN is a user plane security protection method that is fixedly configured. For example, the configured user plane security protection method enabling the user plane encrypted protection is enabled and disabling the user plane integrity protection. The security algorithm supported by the SN includes an encryption algorithm and an integrity protection algorithm that are supported by the SN. The security algorithm supported by the SN varies with a communications system to which the SN belongs. For example, a security algorithm supported by the SN when the SN is an ng-eNB is different from a security algorithm supported by the SN when the SN is a gNB, or a security algorithm supported by the SN when the SN is a ng-eNB is the same as a security algorithm supported by the SN when the SN is a gNB, but identifiers that represent the algorithms are different. For example, the ng-eNB identifies only an algorithm beginning with a letter "E", such as EIA1 or EEA1; the gNB identifies only an algorithm beginning with a letter "N", such as NIA1 or NEA1. EEA1 and NEA1 are different identifiers, but represent a same specific security algorithm. Both NEA1 and EEA1 represent security algorithms that are based on SNOW 3G. The current status information of the UE may include one or more of the following information: a current rate status of the UE, an electricity quantity of the UE, capability limitation information of the UE, and the like. The capability limitation information of the UE is used to indicate whether the UE is a UE whose capability is limited (for example, an Internet of things device) or a UE whose capability is not limited.

When the MN or the SN generates a mapped user plane security policy, the base station that generates the mapped user plane security policy needs to comprehensively consider one or more of the following information: a configuration of the MN, a current status of the MN, a configuration of the SN, a current status of the SN, current status information of the UE, and the like. The configuration of the MN/SN is a user plane security protection method supported by the MN/SN. The current status of the MN/SN is a current resource usage status of the MN/SN. The MN/SN may determine, based on the current resource usage status, whether to activate a type of user plane security protection that is preferably to be activated. The current status information of the UE may include one or more of the following information: the current rate status of the UE, the electricity quantity of the UE, or the capability limitation information of the UE. The capability limitation information of the UE is used to indicate whether the UE is the UE whose capability is limited (for example, the internet of things device) or the UE whose capability is not limited.

A method for generating the mapped user plane security policy by the MN may be as follows.

When the SN is an ng-eNB and the MN is a gNB, the MN may generate the second user plane security policy in the following several manners.

Manner 1: If the MN learns of a user plane security protection method configured on the SN (ng-eNB), the MN may generate the second user plane security policy with reference to the first user plane security policy and the user plane security protection method that is configured on the SN (ng-eNB).

The user plane security protection method configured on the SN (ng-eNB) may be fixedly configured on the SN (ng-eNB), that is, the SN (ng-eNB) can use only the configured user plane security protection method. The user plane security protection method configured on the SN (ng-eNB) may alternatively be configured on the MN, such that the MN can learn of the user plane security protection method configured on the SN (ng-eNB). The MN may alternatively learn of, in another manner, the user plane security protection method configured on the SN (ng-eNB). For example, the SN (ng-eNB) actively notifies the MN of a user plane security protection manner configured on the SN (ng-eNB).

For example, the user plane security protection method configured on the SN (ng-eNB) may be enabling user plane encrypted protection and disabling user plane integrity protection. That the MN generates the second user plane security policy with reference to the first user plane security policy and the user plane security protection method that is configured on the SN (ng-eNB) may include: A. If user plane integrity protection indication information included in the first user plane security policy is "preferred", user plane integrity protection indication information included in the generated second user plane security policy is "not needed"; or if user plane integrity protection indication information included in the first user plane security policy is "not needed", user plane integrity protection indication information included in the generated second user plane security policy is still "not needed". B. If user plane encrypted protection indication information included in the first user plane security policy is "preferred", user plane encrypted protection indication information included in the generated second user plane security policy is "required"; or if user plane encrypted protection indication information included in the first user plane security policy is "required", user plane encrypted protection indication information included in the generated second user plane security policy is still "required". The second user plane security policy generated by the MN is obtained according to the user plane security protection method that is configured on the SN (ng-eNB) and that is enabling the user plane encrypted protection and disabling the user plane integrity protection. If the user plane security protection method configured on the SN (ng-eNB) is of another type, the second user plane security policy generated by the MN may also change. This is determined according to the user plane security protection method configured on the SN (ng-eNB).

It may be understood that, if the MN learns of the user plane security protection method configured on the SN (ng-eNB), the generated second user plane security policy corresponds to the user plane security protection method configured on the SN (ng-eNB). That is, the generated second user plane security policy is the same as a user plane security policy corresponding to the user plane security protection method configured on the SN.

Manner 2: If the MN does not learn of a user plane security protection method configured on the SN (ng-eNB), the MN may generate the second user plane security policy according to the first user plane security policy and with reference to a requirement of an operator or a requirement of network deployment, and the current status information of the UE. In this case, the second user plane security policy generated by the MN may correspond to the user plane security protection method configured on the SN (ng-eNB).

Manner 3: The MN may generate the second user plane security policy with reference to the first user plane security policy and depending on whether the SN supports enabling of the user plane encrypted protection and whether the SN supports enabling of the user plane integrity protection. For example, if the SN (ng-eNB) does not support the enabling of the user plane integrity protection, the user plane integrity protection indication information in the generated second user plane security policy is "not needed".

Manner 4: The MN may generate the second user plane security policy with reference to the first user plane security policy, based on configuration information of the MN, and depending on whether the SN supports the enabling of the user plane encrypted protection and whether the SN supports the enabling of the user plane integrity protection. For example, if the SN (ng-eNB) does not support the enabling of the user plane integrity protection, the user plane integrity protection indication information in the generated second user plane security policy is "not needed"; if both enabling and disabling of encrypted protection of the SN (ng-eNB) are supported, the MN determines, based on content such as the configuration information of the MN and a resource status of the UE, that a user plane encrypted protection indication is "required" or "not needed".

It may be understood that, if the MN generates the second user plane security policy, the MN needs to first determine the user plane security protection method based on the original user plane security policy and with reference to one or more of the following information: the configuration of the MN, the current status of the MN, the configuration of the SN, the current status of the SN, the current status information of the UE, and the like. The user plane security protection method may be further transformed into user plane security enabling type indication information. The MN may convert content of the user plane security enabling type indication information into the second user plane security policy after obtaining the user plane security enabling type indication information. Alternatively, the MN may directly use the user plane security enabling type indication information as the second user plane security policy; in this case, it may be understood that the second user plane security policy is the user plane security enabling type indication information.

When the SN is a gNB and the MN is an ng-eNB, the MN (ng-eNB) may generate the second user plane security policy in the following several manners.

Manner 1: If the MN (ng-eNB) learns of a user plane security protection method of the MN (ng-eNB), the MN (ng-eNB) generates the second user plane security policy with reference to the user plane security protection method of the MN (ng-eNB) and the first user plane security policy. Because the MN is an ng-eNB and the MN is very clear about the user plane security protection method of the MN, the MN may directly generate the second user plane security policy with reference to the user plane security protection method of the MN and the first user plane security policy. For example, if user plane encrypted protection of the MN may be dynamically enabled and the MN does not support user plane integrity protection, the MN may determine, based on information such as the configuration of the MN, the current resource usage status of the MN, and the current status information of the UE, that the user plane encrypted protection is "required" or "not needed". Because the MN does not support the user plane integrity protection, the user plane integrity protection is "not needed". For a generation method, refer to the manner 1 in which the MN generates the second user plane security policy when the SN is an ng-eNB and the MN is a gNB.

The current status information of the UE may include one or more of the following information: the current rate status of the UE, the electricity quantity of the UE, the capability limitation information of the UE, and the like. The capability limitation information of the UE is used to indicate whether the UE is the UE whose capability is limited (for example, the Internet of things device) or the UE whose capability is not limited.

Manner 2: A user plane security protection method is fixedly configured on the MN (ng-eNB), and the MN (ng-eNB) may generate the second user plane security policy with reference to the user plane security protection method configured on the MN (ng-eNB) and the first user plane security policy. In this manner, the generated second user plane security policy is also fixed. For a generation method, refer to the manner 1 in which the MN generates the second user plane security policy when the SN is an ng-eNB and the MN is a gNB.

Manner 3: The MN (ng-eNB) may generate the second user plane security policy according to the first user plane security policy and with reference to an operator's requirement or a network deployment requirement, and the current status information of the UE.

Manner 4: The MN (ng-eNB) dynamically determines, according to user plane encrypted protection indication information included in the first user plane security policy, whether to enable the user plane encrypted protection. For example, the MN (ng-eNB) never enables the user plane encrypted protection. In this manner, user plane encrypted protection indication information included in the second user plane security policy may be the same as the user plane encrypted protection indication information included in the first user plane security policy, and user plane integrity protection indication information included in the second user plane security policy cannot be "required".

Manner 5: The MN (ng-eNB) may generate the second user plane security policy with reference to the first user plane security policy and depending on whether the SN (gNB) supports enabling of user plane encrypted protection and whether the SN (gNB) supports enabling of user plane integrity protection. For example, if the SN (gNB) does not support the enabling of the user plane integrity protection, the user plane integrity protection indication information in the generated second user plane security policy is "not needed".

When the MN has generated the second user plane security policy, the MN may determine a user plane security protection method between the MN and the UE according to the second user plane security policy.

When the MN determines that a user plane security termination point is on the SN, the MN does not need to activate the user plane security protection method between the MN and the UE.

Optionally, before the MN determines whether the security termination point may be on the SN, the MN may determine, based on first information, whether the user plane security termination point may be placed on the SN. The first information may be information locally configured on the MN, or may be the first user plane security policy. For example, if the SN is an ng-eNB, the MN is a gNB, and the user plane integrity protection indication information included in the first user plane security policy is "required", the MN can place the user plane security termination point only on the MN (in other words, a PDU session of the MN is not offloaded or split to the MN), and may determine that the user plane security termination point is on the MN. In all cases except this case, the user plane security termination point may be on the SN. To be more specific, if the user plane integrity protection indication information included in the first user plane security policy is not "required", the MN may determine to place the user plane security termination point on the SN, and may further determine that the user plane security termination point is on the SN. This is applicable to a scenario in which the SN is a gNB or the SN is an ng-eNB.

Further, a user plane security policy of a same PDU session cannot be changed in a PDU lifetime. Additionally, a user plane security termination point of a same PDU session may be flexibly placed on the MN at one moment and placed on the SN at another moment in a dual connectivity scenario. Therefore, when generating a mapped user plane security policy, the MN or the SN needs to consider a capability of the other base station. For example, if either of the base stations is an ng-eNB, and the ng-eNB cannot enable integrity protection, integrity protection in the mapped user plane security policy needs to be disabled, that is, cannot be activated.

In the dual connectivity scenario, the two base stations collaboratively serve a UE, and a user plane security policy of a same PDU session of the UE remains unchanged. Therefore, a user plane security protection method between the MN and the UE is the same as a user plane security protection method between the SN and the UE. Therefore, the mapped user plane security policy may be generated by the MN, or may be generated by the SN. However, it should be noted that, when the user plane security termination point is on the SN, the MN only generates the mapped user plane security policy, and does no need to activate the user plane security protection method between the MN and the UE. When the user plane security termination point is on the SN and the mapped user plane security policy is determined by the SN, the SN not only needs to generate the mapped user plane security policy, but also needs to activate the user plane security protection method between the UE and the SN. In this case, the MN only needs to transfer an original security policy to the SN.

Step S403: The MN sends a first message to the SN, where the first message includes a user plane security policy and a security capability of the UE. Correspondingly, the SN receives the first message from the MN.

The first message may be an SN addition request. For example, when a radio bearer is initially offloaded to the SN, the first message is an SN addition request. The first message may alternatively be an SN modification request.

The security capability of the UE includes a security algorithm supported by the UE in an LTE system and/or a security algorithm supported by the UE in a 5G system. For example, the security capability of the UE is transferred, in a form of an identifier, between an access network and a core network. The security capability of the UE refers to encryption algorithms and integrity protection algorithms that are supported by the UE. The first message carries the security capability of the UE, such that the SN selects, from the security capability of the UE, a to-be-used security algorithm between the SN and the UE based on a system in which the base station is located. For example, if the SN is a gNB, the SN performs selection from the security algorithm supported by the UE in the 5G system, namely, an algorithm represented by an identifier beginning with "N". For another example, if the SN is an ng-eNB, the SN selects the security algorithm between the SN and the UE from the security algorithm supported by the UE in the LTE system, that is, the SN performs selection from an algorithm represented by an identifier beginning with "E".

If the MN does not perform step S402, the user plane security policy carried in the first message is the first user plane security policy. The first message further includes user plane information corresponding to the first user plane security policy, and the user plane information may include a PDU session identifier, namely, an identifier of a PDU session that the UE requests to establish. The user plane information may enable the UE to learn that user plane data received from the MN and the SN is of a same session. To be more specific, the MN and the SN may directly use the user plane information, or may use the user plane information after converting and processing the user plane information, such that the UE may associate the user plane data, sent by the two base stations, with each other. Optionally, the user plane information may further include one or more of a network slice identifier, a QoS flow identifier (QFI), a 5QI, a DRB ID, and the like.

If the MN performs step S402, the user plane security policy carried in the first message is the second user plane security policy, such that the SN activates the user plane security protection method between the SN and the UE according to the second user plane security policy. The first message further includes user plane information corresponding to the second user plane security policy, and the user plane information includes a PDU session identifier and further includes one or more of a network slice identifier, a QFI, a 5QI, a DRB ID, and the like.

Optionally, the first message further includes a Ksn, and the Ksn is calculated by the MN using a Kmn. The Ksn is a root key between the SN and the UE. The SN and the UE may generate, based on the Ksn, a key that is for protecting user plane data and that is between the UE and the SN, for example, a user plane encryption key and a user plane integrity protection key. If a signaling plane path may exist between the SN and the UE, the SN may further generate, based on the Ksn, a key that is for protecting a signaling plane and that is between the UE and the SN. The key for protecting a signaling plane data includes, for example, an RRC signaling plane integrity key and an RRC signaling plane encryption key.

Optionally, the first message further includes identification information, and the identification information is used to indicate whether the user plane security policy carried in the first message is the first user plane security policy or the second user plane security policy. For example, the identification information may be indicated by one bit. For example, "0" indicates that the user plane security policy is the first user plane security policy, and "1" indicates that the user plane security policy is the second user plane security policy. The bit may be a bit added to a bit length of the first user plane security policy or a bit length of the second user plane security policy, or may be a bit independent of the first user plane security policy or the second user plane security policy.

Step S404: The SN determines the user plane security protection method between the SN and the UE.

The SN determines the user plane security protection method between the SN and the UE. In other words, the SN may perform security protection on user plane data using the user plane security protection method between the SN and the UE. For example, if the user plane security protection method between the SN and the UE is enabling user plane encrypted protection and disabling user plane integrity protection, the SN may enable the user plane encrypted protection for the user plane data and disable the user plane integrity protection for the user plane data.

When the SN is an ng-eNB and the MN is a gNB, the SN (ng-eNB) has configured a user plane security protection method, and the SN may directly determine the configured user plane security protection method as the user plane security protection method between the SN and the UE. In this case, the SN does not care whether the first message carries the first user plane security policy or the second user plane security policy.

If the first message includes the first user plane security policy, the SN may determine the user plane security protection method between the SN and the UE according to the first user plane security policy.

In a possible implementation, the SN determines, according to the user plane encrypted protection indication information included in the first user plane security policy, a method for enabling the user plane encrypted protection. For example, if the user plane encrypted protection indication information is "required", the SN enables the user plane encrypted protection between the SN and the UE. If the user plane encrypted protection indication information is "not needed", the SN does not enable the user plane encrypted protection between the SN and the UE. If the user plane encrypted protection indication information is "preferred", the SN determines, based on some conditions, whether to enable the user plane encrypted protection between the SN and the UE. For example, if the SN has a sufficient resource, the SN may enable the user plane encrypted protection between the SN and the UE. The SN determines, according to a user plane integrity protection method in the user plane security protection method configured on the SN, a method for enabling the user plane integrity protection between the SN and the UE. That is, the SN determines the user plane integrity protection method configured on the SN as the method for enabling the user plane integrity protection between the SN and the UE. For example, if the user plane integrity protection method configured on the SN is disabling the user plane integrity protection, the SN does not enable the user plane integrity protection between the SN and the UE. Alternatively, when the SN does not support the user plane integrity protection, the SN directly sets the user plane integrity protection between the SN and the UE to be disabled.

In a possible implementation, the SN determines, based on the user plane integrity protection indication information included in the first user plane security policy, a method for enabling the integrity protection. For example, if the user plane integrity protection indication information is "preferred", the SN determines, based on some conditions, whether to enable the user plane integrity protection between the SN and the UE. For example, if the SN does not support the user plane integrity protection, the SN does not enable the user plane integrity protection between the SN and the UE. For another example, if the security capability of the UE can support enabling of the user plane integrity protection and the SN supports the user plane integrity protection, the SN enables the user plane integrity protection. If the user plane integrity protection indication information is "not needed", the SN does not enable the user plane integrity protection between the SN and the UE. The SN determines and activates, according to a user plane encrypted protection method in the user plane security protection method configured on the SN, a method for enabling the user plane encrypted protection between the SN and the UE. That is, the SN determines the user plane encrypted protection method configured on the SN as the method for enabling the user plane encrypted protection between the SN and the UE. For example, if the user plane encrypted protection method configured on the SN is enabling the user plane encrypted protection, the SN enables the user plane encrypted protection between the SN and the UE.

When the first message includes only the first user plane security policy, the SN generates a third user plane security policy with reference to the first user plane security policy and a capability of the MN. Additionally, the SN determines the user plane security protection method between the SN and the UE according to the third user plane security policy. The third user plane security policy is a mapped user plane security policy generated by the SN. That the SN generates a third user plane security policy with reference to the first user plane security policy and a capability of the MN is similar to that the MN generates a third user plane security policy with reference to the first user plane security policy and the capability of the SN. The SN determines the user plane security protection method between the SN and the UE according to the third user plane security policy. To be more specific, the SN determines, according to user plane encrypted protection indication information included in the third user plane security policy, whether to enable the user plane encrypted protection. Additionally, the SN determines, based on user plane integrity protection indication information included in the third user plane security policy, whether to enable the user plane integrity protection.

If the MN is an ng-eNB, the SN may generate the third user plane security policy with reference to the first user plane security policy and a user plane security protection method configured on the MN (ng-eNB). Additionally, the SN may determine the user plane security protection method between the SN and the UE according to the third user plane security policy.

If the first message includes the second user plane security policy, the SN determines the user plane security protection method between the SN and the UE according to the second user plane security policy. To be more specific, the SN determines, according to the user plane encrypted protection indication information included in the second user plane security policy, whether to enable the user plane encrypted protection. Additionally, the SN determines, according to the user plane integrity protection indication information included in the second user plane security policy, whether to enable the user plane integrity protection. If the second user plane security policy is the user plane security enabling type indication information, the SN directly determines the user plane security protection method according to the user plane security enabling type indication information.

In a possible implementation, the SN determines, according to the user plane encrypted protection indication information included in the first user plane security policy, the method for enabling the user plane encrypted protection. For example, if the user plane encrypted protection indication information is "required", the SN enables the user plane encrypted protection between the SN and the UE. If the user plane encrypted protection indication information is "not needed", the SN does not enable the user plane encrypted protection between the SN and the UE.

In a possible implementation, the SN determines, based on the user plane integrity protection indication information included in the first user plane security policy, the method for enabling the integrity protection. For example, if the user plane integrity protection indication information is "not needed", the SN does not enable the user plane integrity protection between the SN and the UE. The SN determines and activates, according to the user plane encrypted protection method in the user plane security protection method configured on the SN, the method for enabling the user plane encrypted protection between the SN and the UE. That is, the SN determines the user plane encrypted protection method configured on the SN as the method for enabling the user plane encrypted protection between the SN and the UE. For example, if the user plane encrypted protection method configured on the SN is enabling the user plane encrypted protection, the SN enables the user plane encrypted protection between the SN and the UE.

Step S405: The SN selects the security algorithm between the SN and the UE.

The SN may select the security algorithm between the SN and the UE based on the security capability of the UE carried in the first message. For example, if the SN is a gNB, the SN may select the security algorithm between the SN and the UE from the security algorithm supported by the UE in the 5G system.

In a possible implementation, step S405 is performed after step S404. To be more specific, the SN first determines the user plane security protection method between the SN and the UE, and then selects the security algorithm between the SN and the UE. In this case, the SN needs to select only a security algorithm used by a user plane, and needs to re-select a security algorithm used by a signaling plane. In this case, algorithms used by a signaling plane security algorithm and a user plane security algorithm may be the same or may be different. An example meaning of being the same is as follows: if the user plane encrypted protection is enabled, the used user plane security algorithm is the same as the used signaling plane security algorithm; if the user plane integrity protection is enabled, an integrity algorithm used by the user plane is the same as an integrity algorithm used by the signaling plane. An example meaning of being different is as follows: the security algorithm used by the signaling plane is different from the security algorithm used by the user plane provided that the security algorithms include different algorithms. For example, an encryption algorithm A is used as the user plane encryption algorithm, the encryption algorithm used by the signaling plane is an encryption algorithm B, and both the user plane and the signaling plane use an integrity algorithm C.

In a possible implementation, step S405 is performed before step S404. To be more specific, the SN first selects the security algorithm between the SN and the UE, and then determines the user plane security protection method between the SN and the UE. Because the SN first selects the security algorithm between the SN and the UE, the selected security algorithm is used for both signaling plane protection and user plane protection. After the SN determines the user plane security protection method between the SN and the UE, the SN determines, according to the determined user plane security protection method, a selected security algorithm used for the user plane security protection. For example, if the SN first selects an encryption algorithm and an integrity protection algorithm, and then the user plane security protection method determined by the SN is enabling the user plane encryption and disabling the user plane integrity protection, the SN determines that the encrypted protection algorithm is used in the user plane and the user plane integrity protection algorithm is not used.

The SN generates, based on the Ksn carried in the first message, the key that is for protecting the user plane data and that is between the UE and the SN. If a signaling plane path may exist between the SN and the UE, the SN may further generate, based on the Ksn, the key that is for protecting the signaling plane and that is between the UE and the SN.

If the SN determines the user plane security protection method between the SN and the UE, the security algorithm between the SN and the UE, and the key for protecting the user plane data, the SN activates the user plane security protection method between the SN and the UE. In other words, the SN may use the user plane security protection method between the SN and the UE, the security algorithm between the SN and the UE, and the key for protecting the user plane data, to perform security protection on downlink user plane data, and perform security deprotection on uplink user plane data. For example, if the determined user plane security protection method is enabling the user plane encrypted protection and disabling the user plane integrity protection, the user plane encryption algorithm is an encryption algorithm A, and the user plane encryption key is a key K, for the downlink user plane data, user plane encrypted protection is performed on the downlink user plane data using the encryption algorithm A and the key K.

Step S406: The SN sends a second message to the MN, where the second message includes the user plane security enabling type indication information, and the security algorithm that is between the SN and the UE and that is selected by the SN. Correspondingly, the MN receives the second message from the SN.

The second message is used to respond to the first message, and may be an SN addition response, or may be an SN modification response. That is, if the first message is an SN addition request, the second message is an SN addition response.

The user plane security enabling type indication information is used to indicate the user plane security protection method that is between the SN and the UE and that is activated by the SN. The user plane security enabling type indication information may be indicated by two bits. One bit indicates whether the encrypted protection is enabled or disabled, and the other bit indicates whether the integrity protection is enabled or disabled. For example, when the first bit is "1", it indicates that the user plane encrypted protection is enabled; when the second bit is "1", it indicates that the user plane integrity protection is enabled. It is assumed that the user plane security protection method that is between the SN and the UE and that is determined by the SN is enabling the user plane encrypted protection and disabling the user plane integrity protection. In this case, the user plane security enabling type indication information may be represented by "10". The second message carries the user plane security enabling type indication information, such that the MN adds the user plane security enabling type indication information to an RRC connection reconfiguration response, and sends the RRC connection reconfiguration response to the UE, to help the UE learn of the user plane security protection method between the UE and the SN.

If the SN has generated the third user plane security policy, the SN sends the third user plane security policy to the MN, and the SN determines the user plane security protection method between the SN and the UE according to the third user plane security policy. In other words, the third user plane security policy may indicate the user plane security protection method between the SN and the UE, and may be a mapped user plane security policy determined by the SN. The SN sends the third user plane security policy to the MN, such that the MN learns of the user plane security protection method between the SN and the UE. The third user plane security policy may be independent of the second message, and is sent to the MN using a message other than the second message. That is, the third user plane security policy is not carried in the second message.

If the second user plane security policy is the user plane security enabling type indication information, the SN directly determines the user plane security protection method based on the user plane security enabling type indication information.

Optionally, if the MN learns of the user plane security protection method between the SN and the UE, the MN may determine that the user plane security protection method between the MN and the UE is the same as the user plane security protection method between the SN and the UE. It is assumed that the user plane security protection method between the SN and the UE is enabling the user plane encrypted protection and enabling the user plane integrity protection, but the MN does not support the enabling of the user plane integrity protection. In this case, the user plane security protection method between the MN and the UE is enabling the user plane encrypted protection and disabling the user plane integrity protection. In other words, the finally determined user plane security protection method depends on a specific situation.

Optionally, after step S406, the method further includes step S407: The UE and the MN perform an access stratum (AS) security mode command (SMC) procedure.

It should be noted that, step S407 is not necessarily performed after step S406, and may be performed before a dual connectivity procedure, that is, performed when signaling plane security between the UE and the MN needs to be activated.

An AS SMC includes the security algorithm that is between the MN and the UE and that is selected by the MN. The security algorithm may include a signaling plane security algorithm and a user plane security algorithm. The signaling plane security algorithm and the user plane security algorithm may be the same or may be different. If the signaling plane security algorithm and the user plane security algorithm are the same, the selected security algorithm that is transferred is used for both the control plane and the user plane. If the MN determines the user plane security protection method between the MN and the UE, the MN may determine the user plane security algorithm based on the security algorithm used by the signaling plane.

Optionally, after step S406, the method further includes step S408 and step S409.

Step S409a: The MN sends a fifth message to the AMF or the SMF, where the fifth message includes a fourth user plane security policy. Correspondingly, the AMF or the SMF receives the fifth message from the MN.

It should be understood that, if the MN sends the fifth message to the SMF, content in the fifth message needs to be forwarded to the SMF using the AMF.

The fifth message may be a security result message. The message is used to notify the AMF or the SMF of a user plane security enabling result.

If the MN receives the third user plane security policy, the fourth user plane security policy included in the security result message is a third user plane security policy. The third user plane security policy may indicate the user plane security protection method between the SN and the UE.

If the MN does not receive the third user plane security policy, the MN may generate a user plane security policy according to the user plane security protection method between the SN and the UE, and use the user plane security policy as a fourth user plane security policy. The fourth user plane security policy may indicate the user plane security protection method between the SN and the UE.

The fourth user plane security policy included in the fifth message may alternatively be a mapped user plane security policy generated by the MN. The mapped user plane security policy may indicate the user plane security protection method between the SN and the UE.

The fifth message further includes user plane information corresponding to the fourth user plane security policy, and the user plane information may include a PDU session identifier and further includes one or more of a network slice identifier, a QFI, a 5QI, a DRB ID, and the like.

Step S409: The AMF sends a sixth message to the MN. Correspondingly, the MN receives the sixth message from the AMF.

The sixth message is used to respond to the fifth message, and the sixth message may be a security result response message used to notify the MN that the AMF or the SMF receives the security result message.

Step S410: The MN sends a third message to the UE, where the third message includes the security algorithm determined by the SN and the user plane security enabling type indication information. Correspondingly, the UE receives the third message from the MN.

The third message may be an RRC connection reconfiguration request.

The user plane security enabling type indication information is used to indicate the user plane security protection method that is between the SN and the UE and that is activated by the SN.

Optionally, the third message further includes an SN counter, the SN counter is used by the UE to generate a Ksn, and the Ksn is the same as the Ksn calculated by the MN. The UE may generate, based on the Ksn, a key for protecting user plane data. Because the Ksn is the same as the Ksn calculated by the MN, the key that is for protecting the user plane data and that is generated by the UE is the same as the key that is for protecting the user plane data and that is generated by the SN. As such, the UE and the SN use the same key to protect the user plane data. If a signaling plane path may exist between the SN and the UE, the UE may further generate, based on the Ksn, a key for protecting a signaling plane data, where the key is the same as the key that is for protecting the signaling plane and that is generated by the SN.

Step S411: The UE activates the user plane security protection method between the UE and the SN using the security algorithm determined by the SN.

If the UE receives the third message, the UE may learn of a security algorithm that is between the SN and the UE and that is selected by the SN, and the UE performs security protection on the uplink user plane data using the security algorithm.

If the UE receives the third message, the UE may learn of the user plane security protection method between the SN and the UE. The UE activates the user plane security protection method between the UE and the SN, that is, protects user plane data between the UE and the SN according to the user plane security protection method. In this case, the UE does not activate the user plane security protection method between the UE and the MN.

Optionally, if the third message includes the SN counter, the UE generates a Ksn based on the SN counter, and the Ksn is the same as the Ksn calculated by the MN. The UE may generate, based on the Ksn, a key for protecting user plane data. Because the Ksn is the same as the Ksn calculated by the MN, the key that is for protecting the user plane data and that is generated by the UE is the same as the key that is for protecting the user plane data and that is generated by the SN. As such, the UE and the SN use the same key to protect the user plane data. If a signaling plane path may exist between the SN and the UE, the UE may further generate, based on the Ksn, a key for protecting a signaling plane data, where the key is the same as the key that is for protecting the signaling plane and that is generated by the SN.

Step S412: The UE sends a fourth message to the MN. Correspondingly, the MN receives the fourth message from the UE.

The fourth message may be an RRC connection reconfiguration response, and the RRC connection reconfiguration response is used to respond to the RRC connection reconfiguration request.

That the UE performs security protection on the uplink user plane data according to the user plane security protection method between the UE and the SN may include that the UE performs security protection on the uplink user plane data using the user plane security protection method between the UE and the SN, the security algorithm between the UE and the SN, and the key for protecting the user plane data. The UE performs security deprotection on the uplink user plane data according to the user plane security protection method between the UE and the SN. Performing security protection refers to performing encrypted protection and/or performing integrity protection. The security deprotection refers to decryption and/or verification of integrity protection.

Step S413: The UE sends, to the MN, first uplink user plane data obtained after security protection is performed according to the user plane security protection method between the UE and the SN. Correspondingly, the MN receives the first uplink user plane data from the UE.

The UE performs security protection on the uplink user plane data using the user plane security protection method activated by the SN, the security algorithm selected by the SN, and the generated key for protecting the user plane data. Additionally, the UE sends the first uplink user plane data after security protection to the MN.

For example, if the user plane security protection method activated by the SN is enabling the user plane encrypted protection and disabling the user plane integrity protection, and the security algorithm determined by the SN is using a user plane encrypted protection algorithm A without using the user plane integrity protection algorithm, the UE: performs encrypted protection on the uplink user plane data using the user plane encrypted protection algorithm A and the generated key for protecting the user plane data; sends, to the MN, uplink user plane data encrypted using the encrypted protection algorithm A and the key; and does not perform integrity protection on the uplink user plane data obtained after encrypted protection.

Step S414: The MN sends, to the SN, the first uplink user plane data obtained after the security protection is performed according to the user plane security protection method between the UE and the SN. Correspondingly, the SN receives the first uplink user plane data from the MN.

The MN forwards, to the SN, the first uplink user plane data after security protection received by the UE.

In step S413 and step S414, the MN forwards, to the SN according to the user plane security protection method between the SN and the UE, the uplink user plane data sent by the UE. That is, the MN transparently transmits the uplink user plane data after security protection. Because the UE activates only the user plane security protection method between the UE and the SN, and the UE sends the uplink user plane data to the MN according to the user plane security protection method between the UE and the SN, when receiving the uplink user plane data, the MN can only forward the uplink user plane data to the SN.

Because the user plane security termination point is the SN, the MN does not perform any security operation, and directly forwards the received data to the SN.

Step S415: The UE sends, to the SN, second uplink user plane data obtained after security protection is performed according to the user plane security protection method between the UE and the SN. Correspondingly, the SN receives the second uplink user plane data from the UE.

The UE performs security protection on the uplink user plane data using the user plane security protection method activated by the SN, the security algorithm selected by the SN, and the generated key for protecting the user plane data. Additionally, the UE sends the second uplink user plane data after security protection to the SN.

Step S416: The SN performs security deprotection on uplink user plane data.

That when the SN receives the uplink user plane data forwarded by the MN, the SN performs security deprotection on the uplink user plane data according to the user plane security protection method activated by the SN includes: performing integrity protection verification on the uplink user plane data according to the user plane security protection method activated by the SN; and decrypting the uplink user plane data according to the security algorithm selected by the SN and the generated key for protecting the user plane data.

That when the SN receives the uplink user plane data from the UE, the SN performs security deprotection on the uplink user plane data according to the user plane security protection method activated by the SN includes: performing integrity protection verification on the uplink user plane data according to the user plane security protection method activated by the SN; and decrypting the uplink user plane data according to the security algorithm selected by the SN and the generated key for protecting the user plane data.

If encrypted protection is first performed and then integrity protection is performed on the uplink user plane data sent by the UE, when the SN receives the uplink user plane data, the SN first performs integrity protection verification on and then decrypts the uplink user plane data. If integrity protection is first performed and then encrypted protection is performed on the uplink user plane data sent by the UE, when the SN receives the uplink user plane data, the SN first decrypts and then performs integrity protection verification on the uplink user plane data.

Step S417: The SN sends the uplink user plane data after security deprotection to the UPF.

The SN sends the uplink user plane data after decryption and integrity protection verification to the UPF, such that the UPF sends the uplink user plane data to a corresponding data network.

Step S413 to step S417 are for security protection of the uplink user plane data. For the downlink user plane data, the SN receives the downlink user plane data from the UPF, and performs security protection on the downlink user plane data using the user plane security protection method between the SN and the UE, the security algorithm between the SN and the UE, and the generated key for protecting the user plane data. Through one connection, the SN directly sends downlink user plane data after security protection to the UE. Through the other connection, the SN sends downlink user plane data after security protection to the UE using the MN. When receiving the downlink user plane data after security protection, the UE performs security deprotection on the downlink user plane data according to the user plane security protection method between the UE and the SN, such that the UE obtains the downlink user plane data.

In the embodiment shown in FIG. 4A and FIG. 4B, the MN determines that the user plane security termination point is on the SN, the SN activates and notifies the MN of the user plane security protection method and the security algorithm between the SN and the UE. The MN notifies the UE of the user plane security protection method activated by the SN and the security algorithm selected by the SN. Additionally, the UE may perform security protection on the uplink user plane data according to the user plane security protection method and the security algorithm, to implement user plane security protection between the UE and the SN, thereby ensuring confidentiality and integrity of user plane data transmission in a 5G dual connectivity scenario.

In an optional embodiment, if the SN is a gNB, and there may be a signaling plane path between the SN and the UE, when the SN determines the user plane security protection method and the security algorithm between the SN and the UE, the SN may directly send, to the UE using an RRC connection reconfiguration message, the user plane security enabling type indication information and the security algorithm that is selected by the SN. If the UE receives the RRC connection reconfiguration message from the SN, the UE performs security protection on the uplink user plane data according to the user plane security protection method activated by the SN and the selected security algorithm, and sends the uplink user plane data to the SN.

Figure 5A:
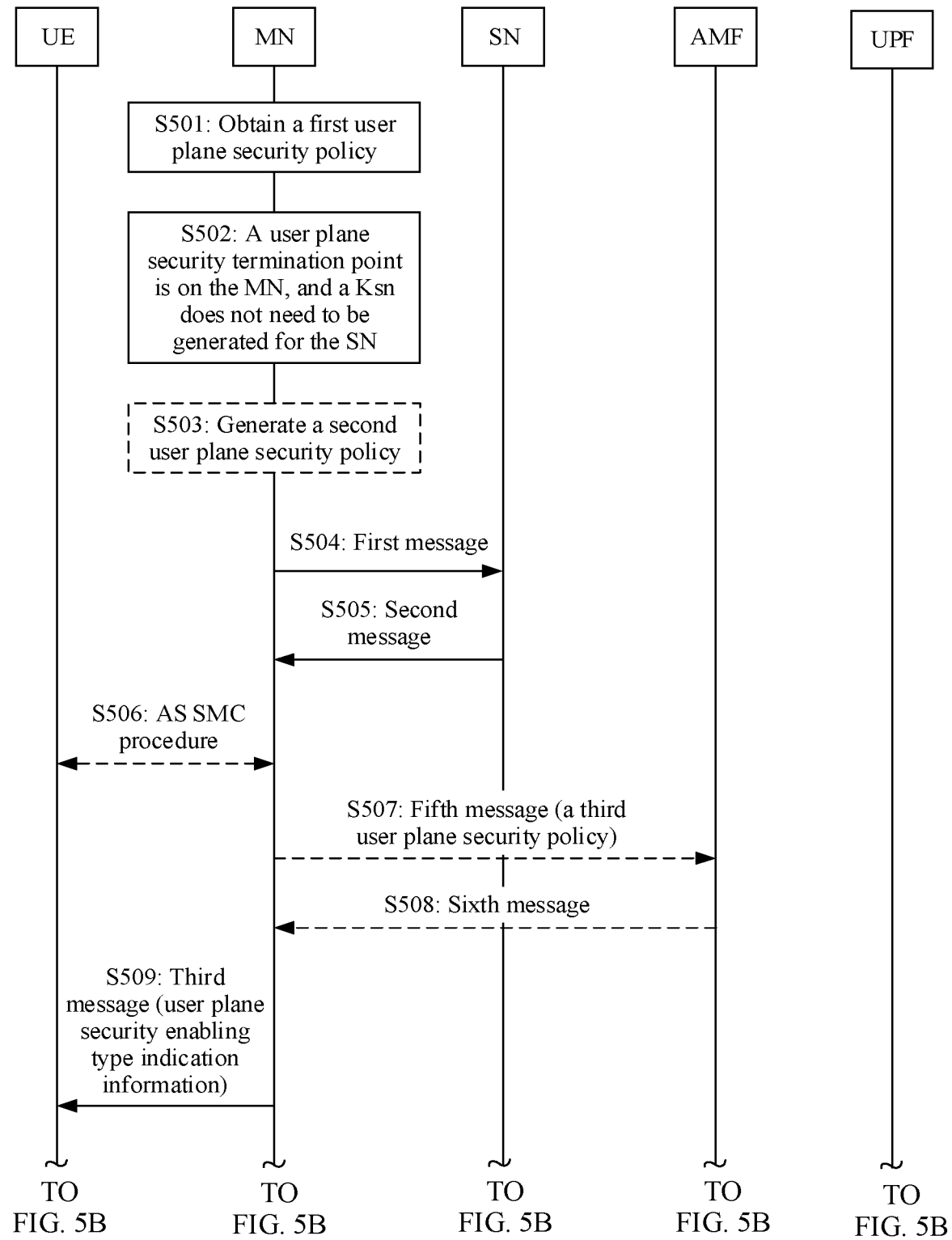
FIG. 5A and FIG. 5B are schematic flowcharts of a method for dual-connectivity communication according to a second embodiment of this application.
Figure 5B:
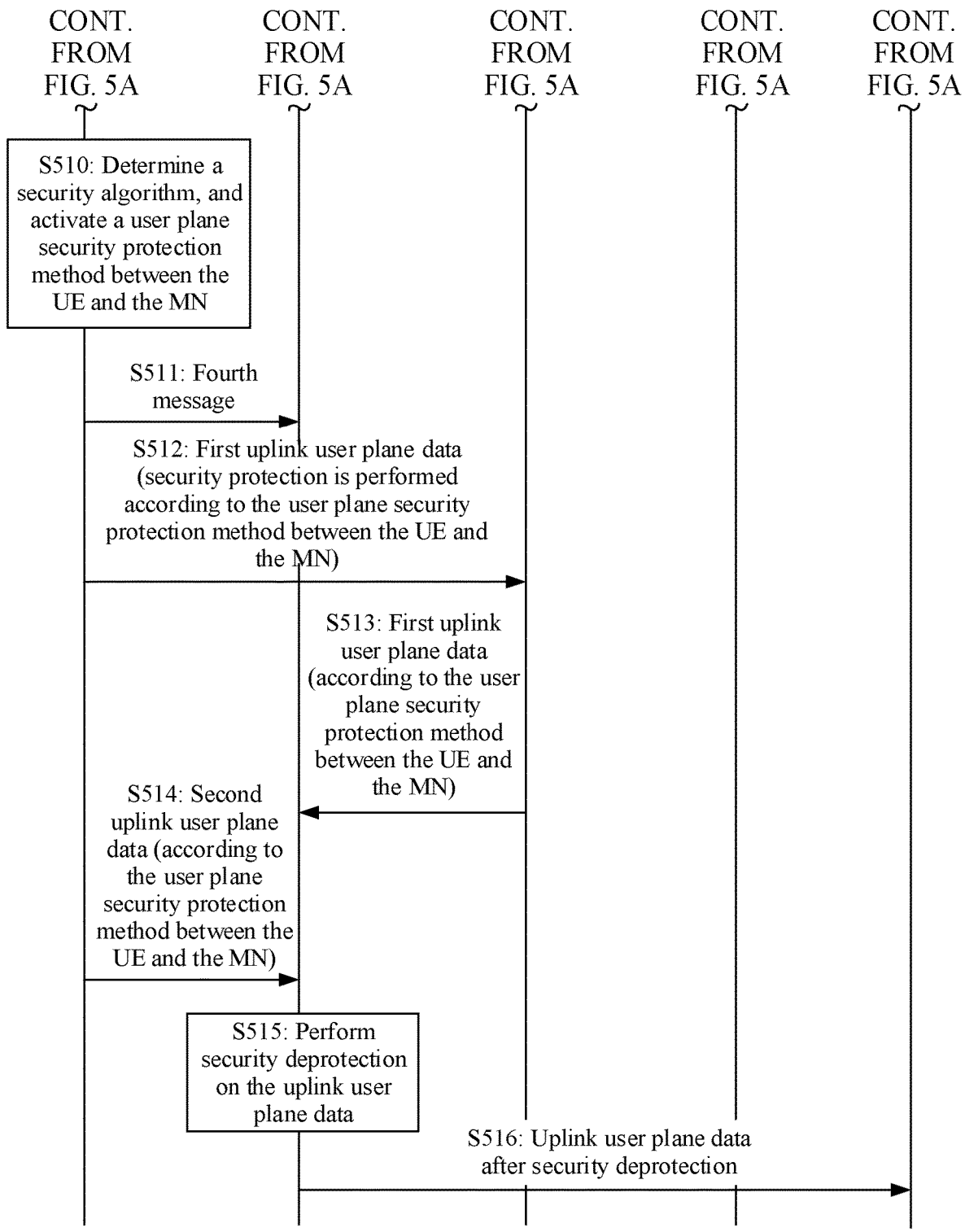

Using an example in which an embodiment of this application is applied to the schematic diagram of the dual connectivity network architecture shown in FIG. 3B, FIG. 5A and FIG. 5B are schematic flowcharts of a method for dual-connectivity communication according to a second embodiment of this application. In this embodiment, a UE is used as an example of a user terminal, an AMF is used as an example of an access management network element, an SMF is used as an example of a session management network element, and a UPF is used as an example of a user plane network element for description. The method may include but is not limited to the following steps.

Step S501: An MN obtains a first user plane security policy.

For an implementation process of step S501, refer to the description of step S401 in the embodiment shown in FIG. 4A and FIG. 4B. Details are not described herein again.

Step S502: If a user plane security termination point is on the MN, the MN does not need to generate a Ksn for an SN.

When the user plane security termination point is on the MN, the MN performs security protection on user plane data. In this case, the MN does not need to generate the Ksn for the SN, that is, does not need to calculate the Ksn using a Kmn.

If the MN is an ng-eNB, and a user plane security protection method may be fixedly configured on the ng-eNB, the MN may determine the user plane security protection method configured on the MN as a user plane security protection method between the MN and the UE, and activate the user plane security protection method between the MN and the UE.

Optionally, after step S502, the method further includes step S503: The MN generates a second user plane security policy.

For an implementation process of step S503, refer to the description of step S402 in the embodiment shown in FIG. 4A and FIG. 4B. Details are not described herein again.

That the MN may determine the user plane security protection between the MN and the UE based on the generated second user plane security policy may be similar to that the SN determines the user plane security protection between the SN and the UE based on the generated second user plane security policy in the embodiment shown in FIG. 4A and FIG. 4B. If the MN determines the user plane security protection method between the MN and the UE, the MN activates the user plane security protection method between the MN and the UE.

Step S504: The MN sends a first message to the SN. Correspondingly, the SN receives the first message from the MN.

A difference from step S403 is that, in step S504, the first message does not carry any user plane security policy, and the first message does not carry the Ksn because the MN does not generate the Ksn. The first message in step S504 may carry a PDU session identifier, and may further carry other user plane information, for example, a DRB identifier.

Step S505: The SN sends a second message to the MN. Correspondingly, the MN receives the second message from the SN.

Optionally, after step S505, the method further includes step S506: The UE and the MN perform an AS SMC procedure.

For an implementation process of step S506, refer to the description of step S407 in the embodiment shown in FIG. 4A and FIG. 4B. Details are not described herein again.

Optionally, after step S505, the method further includes step S507 and step S508.

Step S507: The MN sends a fifth message to the AMF, where the fifth message includes a third user plane security policy. Correspondingly, the AMF receives the fifth message from the MN.

The fifth message may be a security result message.

If the MN generates the second user plane security policy, the third user plane security policy carried in the security result message is the second user plane security policy generated by the MN. If the MN does not generate the second user plane security policy, the third user plane security policy carried in an N2request is the obtained first user plane security policy.

Step S508: The AMF sends a sixth message to the MN. Correspondingly, the MN receives the sixth message from the AMF.

Step S509: The MN sends a third message to the UE, where the third message includes user plane security enabling type indication information. Correspondingly, the UE receives the third message from the MN.

The third message may be an RRC connection reconfiguration request.

The user plane security enabling type indication information is used to indicate the user plane security protection method that is between the MN and the UE and that is activated by the MN.

Step S510: The UE determines a security algorithm, and activates the user plane security protection method between the UE and the MN.

The UE may learn of the security algorithm between the MN and the UE from an AS SMC.

If the UE receives the third message, the UE may learn of the user plane security protection method between the MN and the UE. The UE activates the user plane security protection method between the UE and the MN. That is, the UE performs security protection on user plane data between the UE and the MN according to the user plane security protection method. In this case, the UE does not activate a user plane security protection method between the UE and the SN.

Step S511: The UE sends a fourth message to the MN. Correspondingly, the MN receives the fourth message from the UE.

That the UE performs security protection on the uplink user plane data according to the user plane security protection method between the UE and the MN may include that the UE performs security protection on the uplink user plane data using the user plane security protection method between the UE and the MN, the security algorithm between the UE and the MN, and the key for protecting the user plane data.

Step S512: The UE sends, to the SN, first uplink user plane data obtained after security protection is performed according to the user plane security protection method between the UE and the MN. Correspondingly, the SN receives the first uplink user plane data from the UE.

Step S513: The SN sends, to the MN, the first uplink user plane data obtained after the security protection is performed according to the user plane security protection method between the UE and the MN. Correspondingly, the MN receives the first uplink user plane data from the SN.

In step S512 and step S513, the SN forwards, to the MN according to the user plane security protection method between the MN and the UE, the uplink user plane data sent by the UE. That is, the SN transparently transmits the uplink user plane data obtained after the UE performs security protection.

Step S514: The UE sends, to the MN, second uplink user plane data obtained after security protection is performed according to the user plane security protection method between the UE and the MN. Correspondingly, the MN receives the second uplink user plane data from the UE.

Step S515: The MN performs security deprotection on the uplink user plane data.

Step S516: The MN sends the uplink user plane data after security deprotection to the UPF.

In the embodiment shown in FIG. 5A and FIG. 5B, the MN determines that the user plane security termination point is on the MN, and the MN notifies the MN of the user plane security protection method between the MN and the UE. The MN notifies the UE of the user plane security protection method between the UE and the MN, and the UE may perform security protection on the uplink user plane data according to the user plane security protection method, to implement user plane security protection between the UE and the MN, thereby ensuring confidentiality and integrity of user plane data transmission in a 5G dual connectivity scenario.

The foregoing describes in detail the methods in the embodiments of this application. The following provides apparatuses in the embodiments of this application.

Figure 6:
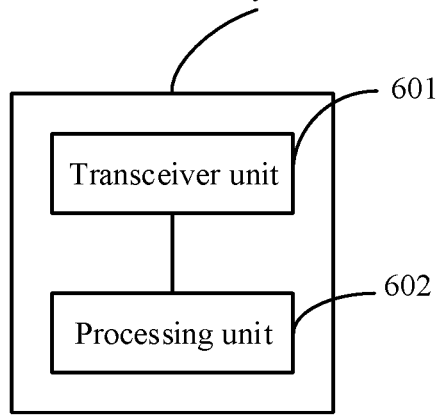
FIG. 6 is a schematic diagram of a logical structure of an apparatus for dual-connectivity communication according to an embodiment of this application.

FIG. 6 is a schematic diagram of a logical structure of an apparatus for dual-connectivity communication according to an embodiment of this application. The apparatus 60 for dual-connectivity communication may include a transceiver unit 601 and a processing unit 602. The apparatus 60 for dual-connectivity communication may be a master Node, or may be a secondary Node, or may be a user terminal.

For a case in which the apparatus 60 for dual-connectivity communication is a master Node, the transceiver unit 601 is configured to: send a first message to a secondary Node, where the first message includes a user plane security policy, and the user plane security policy is used by the secondary Node to determine a user plane security protection method between the secondary Node and a user terminal; receive a second message from the secondary Node, where the second message includes user plane security enabling type indication information, and the user plane security enabling type indication information is used to indicate the user plane security protection method between the secondary Node and the user terminal; and send a third message to the user terminal, where the third message includes the user plane security enabling type indication information. The master Node may further include a processing unit 602 configured to generate a second user plane security policy.

In a possible implementation, the processing unit 602 is configured such that when the secondary Node does not support user plane integrity protection, the processing unit 602 determines that user plane integrity protection indication information in the user plane security policy is not "required".

In a possible implementation, the processing unit 602 is further configured to obtain a first user plane security policy of the user terminal.

In a possible implementation, the processing unit 602 is further configured to generate the second user plane security policy according to the first user plane security policy of the user terminal.

In a possible implementation, the processing unit 602 is further configured to: determine a user plane security protection method between the master Node and the user terminal according to the second user plane security policy; and when a user plane security termination point is on the secondary Node, skip activating the user plane security protection method between the master Node and the user terminal.

In a possible implementation, the transceiver unit 601 is further configured to: receive uplink user plane data from the user terminal, where the uplink user plane data is data obtained after the user terminal performs security protection according to the user plane security protection method between the user terminal and the secondary Node; and send the uplink user plane data to the secondary Node.

When the apparatus 60 for dual-connectivity communication is a master Node, in addition to implementing a function of the MN in the method embodiment in FIG. 4A and FIG. 4B, the apparatus 60 for dual-connectivity communication can further implement a function of the MN in the embodiment shown in FIG. 5A and FIG. 5B. For a detailed process performed by each unit in the apparatus 60 for dual-connectivity communication, refer to the steps performed by the MN in the foregoing method embodiments. Details are not described herein again.

For a case in which the apparatus 60 for dual-connectivity communication is a secondary Node: the transceiver unit 601 is configured to receive a first message from a master Node, where the first message includes a user plane security policy; the processing unit 602 is configured to determine a user plane security protection method between the secondary Node and a user terminal according to the user plane security policy; the processing unit 602 is further configured to activate the user plane security protection method between the secondary Node and the user terminal; and the transceiver unit 601 is further configured to send a second message to the master Node, where the second message includes user plane security enabling type indication information, and the user plane security enabling type indication information is used to indicate the user plane security protection method between the secondary Node and the user terminal.

In a possible implementation, the user plane security policy is a first user plane security policy of the user terminal. When the processing unit 602 is configured to determine the user plane security protection method between the secondary Node and the user terminal according to the user plane security policy, the processing unit 601 is configured to: generate a third user plane security policy according to the first user plane security policy; and determine the user plane security protection method between the secondary Node and the user terminal according to the third user plane security policy.

In a possible implementation, the user plane security policy is a second user plane security policy generated by the master Node according to the first user plane security policy. When the processing unit 602 is configured to determine the user plane security protection method between the secondary Node and the user terminal according to the user plane security policy, the processing unit 602 is configured to determine the user plane security protection method between the secondary Node and the user terminal according to the second user plane security policy.

In a possible implementation, the transceiver unit 601 is further configured to receive first uplink user plane data and second uplink user plane data respectively from the master Node and the user terminal, where the first uplink user plane data and the second user plane data are user plane data obtained after the user terminal performs security protection according to the user plane security protection method between the user terminal and the secondary Node. The processing unit 602 is further configured to perform security deprotection on the first uplink user plane data and the second user plane data, to obtain user plane data after security deprotection. The transceiver unit 601 is further configured to send the user plane data after security deprotection to a user plane network element.

When the apparatus 60 for dual-connectivity communication is a secondary Node, in addition to implementing a function of the SN in the method embodiment in FIG. 4A and FIG. 4B, the apparatus 60 for dual-connectivity communication can further implement a function of the SN in the embodiment shown in FIG. 5A and FIG. 5B. For a detailed process performed by each unit in the apparatus 60 for dual-connectivity communication, refer to the steps performed by the SN in the foregoing method embodiments. Details are not described herein again.

For a case in which the apparatus 60 for dual-connectivity communication is a user terminal: the transceiver unit 601 is configured to receive a third message from a master Node, where the third message includes user plane security enabling type indication information and a security algorithm that is selected by the secondary Node, and the user plane security enabling type indication information is used to indicate a user plane security protection method between the secondary Node and the user terminal; the processing unit 602 is configured to activate the user plane security protection method between the user terminal and the secondary Node according to the user plane security enabling type indication information and the security algorithm that is selected by the secondary Node; and the processing unit 602 is further configured to perform security protection on uplink user plane data according to the user plane security protection method between the user terminal and the secondary Node.

In a possible implementation, when the processing unit 602 is configured to perform security protection on uplink user plane data according to the user plane security protection method between the user terminal and the secondary Node, the processing unit 602 is configured to control the transceiver unit 601 to send first uplink user plane data and second uplink user plane data to the secondary Node and the master Node respectively. The first uplink user plane data and the second user plane data are user plane data obtained after the user terminal performs security protection according to the user plane security protection method between the user terminal and the secondary Node.

When the apparatus 60 for dual-connectivity communication is a user terminal, in addition to implementing a function of the UE in the method embodiment in FIG. 4A and FIG. 4B, the apparatus 60 for dual-connectivity communication can further implement a function of the UE in the embodiment shown in FIG. 5A and FIG. 5B. For a detailed process performed by each unit in the apparatus 60 for dual-connectivity communication, refer to the steps performed by the UE in the foregoing method embodiments. Details are not described herein again.

Figure 7:
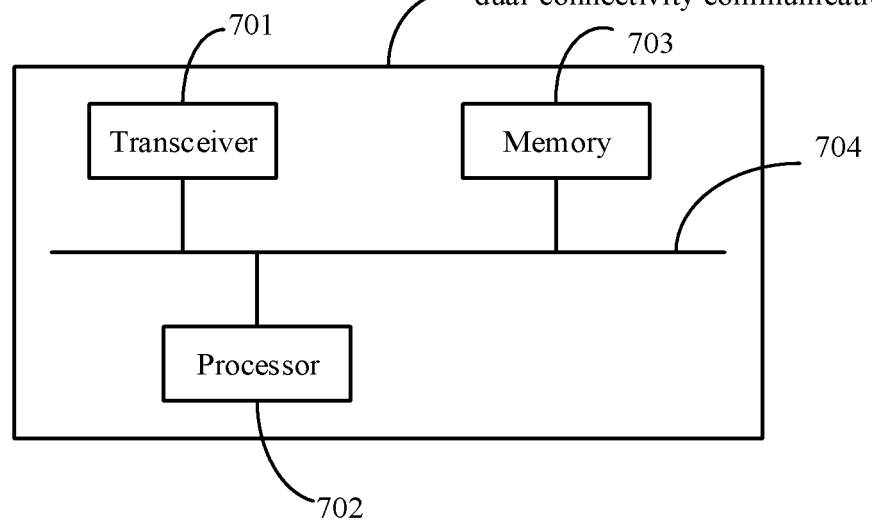
FIG. 7 is a simplified schematic diagram of a physical structure of an apparatus for dual-connectivity communication according to an embodiment of this application.

FIG. 7 is a simplified schematic diagram of a physical structure of an apparatus for dual-connectivity communication according to an embodiment of this application. The apparatus 70 for dual-connectivity communication may be a master Node, or may be a secondary Node, or may be a user terminal.

The apparatus 70 for dual-connectivity communication includes a transceiver 701, a processor 702, and a memory 703. The transceiver 701, the processor 702, and the memory 703 may be connected to each other using a bus 704, or may be connected to each other in another manner. A related function implemented by the transceiver unit 601 shown in FIG. 6 may be implemented by the transceiver 701. A related function implemented by the processing unit 602 shown in FIG. 6 may be implemented using one or more processors 702.

The memory 703 includes but is not limited to a random access memory (RAM), a read-only memory (ROM), an erasable programmable read-only memory (EPROM), or a portable compact disk (CD) read-only memory (CD-ROM). The memory 703 is used for a related instruction and related data.

The transceiver 701 is configured to: send data and/or signaling; and receive data and/or signaling.

If the apparatus 70 for dual-connectivity communication is the MN in the embodiments shown in FIG. 4A and FIG. 4B and FIG. 5A and FIG. 5B, the transceiver 701 may be configured to communicate with UE, an SN, an AMF, and a UPF, for example, perform step S403, step S406, step S407, step S408, step S409, step S410, step S413, and step S414 in the embodiment shown in FIG. 4A and FIG. 4B, and perform step S504, step S505, step S506, step S507, step S508, step S509, step S511, step S513, step S514, and step S516 in the embodiment shown in FIG. 5A and FIG. 5B. It should be noted that, when the user plane security termination point is on the MN, the transceiver 701 performs user plane data transmission with the UPF.

If the communications apparatus 70 is the SN in the embodiments shown in FIG. 4A and FIG. 4B and FIG. 5A and FIG. 5B, the transceiver 701 may be configured to communicate with the MN, the UE, and the UPF, for example, perform step S403, step S406, step S414, step S415, and step S417 in the embodiment shown in FIG. 4A and FIG. 4B, and perform step S504, step S505, step S512, and step S513 in the embodiment shown in FIG. 5A and FIG. 5B. It should be noted that, when the user plane security termination point is on the SN, the transceiver 701 performs user plane data transmission with the UPF.

If the communications apparatus 70 is the UE in the embodiments shown in FIG. 4A and FIG. 4B and FIG. 5A and FIG. 5B, the transceiver 701 may be configured to communicate with the MN and the SN, for example, perform step S407, step S410, step S412, step S413, and step S415 in the embodiment shown in FIG. 4A and FIG. 4B, and perform step S506, step S509, step S511, step S512, and step S514 in the embodiment shown in FIG. 5A and FIG. 5B.

The processor 702 may include one or more processors, for example, includes one or more central processing units (CPUs). When the processor 702 is one CPU, the CPU may be a single-core CPU, or may be a multi-core CPU.

If the communications apparatus 70 is the MN in the embodiments shown in FIG. 4A and FIG. 4B and FIG. 5A and FIG. 5B, the processor 702 may be configured to perform an operation of controlling the MN, for example, perform step S401 and step S402 in the embodiment shown in FIG. 4A and FIG. 4B, and perform step S501, step S502, step S503, and step S515 in the embodiment shown in FIG. 5A and FIG. 5B.

If the communications apparatus 70 is the SN in the embodiments shown in FIG. 4A and FIG. 4B and FIG. 5A and FIG. 5B, the processor 702 may be configured to perform an operation of controlling the SN, for example, perform step S404, step S405, and step S416 in the embodiment shown in FIG. 4A and FIG. 4B.

If the communications apparatus 70 is the UE in the embodiments shown in FIG. 4A and FIG. 4B and FIG. 5A and FIG. 5B, the processor 702 may be configured to perform an operation of controlling the MN, for example, perform step S411 in the embodiment shown in FIG. 4A and FIG. 4B, and perform step S510 in the embodiment shown in FIG. 5A and FIG. 5B.

The memory 703 is configured to store program code and data of the apparatus 70 for dual-connectivity communication.

For details about steps performed by the processor 702 and the transceiver 701, refer to the descriptions in the embodiments shown in FIG. 4A and FIG. 4B and FIG. 5A and FIG. 5B. Details are not described herein again.

It may be understood that FIG. 7 shows only a simplified design of the apparatus for dual-connectivity communication. During actual application, the apparatus for dual-connectivity communication may further separately include other necessary components, including but not limited to any quantity of transceivers, processors, controllers, memories, or communications units. All devices capable of implementing this application fall within the protection scope of this application.

An embodiment of this application further provides a system for dual-connectivity communication. The system for dual-connectivity communication may include a master Node and a secondary Node. The master Node and the secondary Node may be configured to implement functions of the MN and the SN in the embodiment shown in FIG. 4A and FIG. 4B, and may be further configured to implement functions of the MN and the SN in the embodiment shown in FIG. 5A and FIG. 5B.

The system for dual-connectivity communication may further include a user terminal. The user terminal may be configured to implement a function of the UE in the embodiment shown in FIG. 4A and FIG. 4B, and may be further configured to implement a function of the UE in the embodiment shown in FIG. 5A and FIG. 5B.

The system for dual-connectivity communication may further include a user plane network element. The user plane network element may be configured to: interact with a secondary Node, receive uplink user plane data from the secondary Node; and send downlink user plane data to the secondary Node, to implement a function of the UPF in the embodiment shown in FIG. 4A and FIG. 4B. The user plane network element may be configured to: interact with a master Node; receive uplink user plane data from the master Node; and send downlink user plane data to the master Node, to implement a function of the UPF in the embodiment shown in FIG. 5A and FIG. 5B.

The system for dual-connectivity communication may further include an access management network element. The access management network element may be configured to interact with the master Node, to implement a function of the AMF in the embodiment shown in FIG. 4A and FIG. 4B, and may further implement a function of the AMF in the embodiment shown in FIG. 5A and FIG. 5B.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium includes: any medium that can store program code, such as a ROM or a random access memory RAM, a magnetic disk or an optical disc, and or the like. Therefore, another embodiment of this application provides a computer-readable storage medium. The computer-readable storage medium stores an instruction. When the instruction is run on a computer, the computer is enabled to perform the methods in the foregoing aspects.

Another embodiment of this application further provides a computer program product including an instruction. When the computer program product is run on a computer, the computer is enabled to perform the methods in the foregoing aspects.

A person of ordinary skill in the art may be aware that, in combination with the examples described in the embodiments disclosed in this application, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that such implementation go beyond the scope of this application.

It may be understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

In addition, functional units in the embodiments of this application may be integrated into one processing unit, or each of the units may exist alone physically, or two or more units are integrated into one unit.

What is claimed is:

1. A system for dual-connectivity communication, comprising:
    a master Node configured to send a first message, wherein the first message comprises a user plane security policy; and
    a secondary Node configured to:
        receive the first message from the master Node;
        determine a user plane security protection method between the secondary Node and a user terminal according to the user plane security policy; and
        send a second message to the master Node, wherein the second message comprises user plane security enabling type indication information, wherein the user plane security enabling type indication information indicates the user plane security protection method between the secondary Node and the user terminal, wherein the master Node is further configured to:
        receive the second message from the secondary Node; and
        send a third message to the user terminal, and wherein the third message comprises the user plane security enabling type indication information.

2. The system of claim 1, wherein the master Node is further configured to determine that user plane integrity protection indication information in the user plane security policy is not required if the secondary Node does not support user plane integrity protection.

3. The system of claim 1, wherein the second message further comprises a security algorithm between the secondary Node and the user terminal, and wherein the third message further comprises the security algorithm between the secondary Node and the user terminal.

4. The system of claim 1, wherein the user plane security policy in the first message is a second user plane security policy, wherein the master Node is further configured to obtain a first user plane security policy of the user terminal, and wherein the first user plane security policy is from a session management network element.

5. The system of claim 4, wherein the second user plane security policy is the first user plane security policy of the user terminal, and wherein the secondary Node is further configured to determine the user plane security protection method by:
    generating a third user plane security policy according to the first user plane security policy; and
    determining the user plane security protection method between the secondary Node and the user terminal according to the third user plane security policy.

6. The system of claim 4, wherein the master Node is further configured to generate the second user plane security policy according to the first user plane security policy of the user terminal.

7. The system of claim 6, wherein second user plane integrity protection indication information in the second user plane security policy is not needed when the secondary Node does not support user plane integrity protection and user plane integrity protection indication information in the first user plane security policy is required.

8. The system of claim 6, wherein second user plane integrity protection indication information in the second user plane security policy is not needed when the secondary Node does not support user plane integrity protection and user plane integrity protection indication information in the first user plane security policy is preferred.

9. The system of claim 8, wherein the secondary Node is a next generation evolved Node B (ng-eNB).

10. The system of claim 6, wherein second user plane integrity protection indication information in the second user plane security policy when the secondary Node does not support user plane integrity protection and user plane integrity protection indication information in the first user plane security policy is not needed.

11. The system of claim 6, wherein if the master Node does not support user plane integrity protection and the secondary Node supports the user plane integrity protection, when user plane integrity protection indication information in the first user plane security policy is preferred, second user plane integrity protection indication information in the second user plane security policy is not needed.

12. The system of claim 11, wherein the master Node is a next generation evolved Node B (ng-eNB), and wherein the secondary Node is a next generation Node B (gNB).

13. The system of claim 6, wherein if the master Node does not support user plane integrity protection and the secondary Node supports the user plane integrity protection, when user plane integrity protection indication information in the first user plane security policy is not needed, second user plane integrity protection indication information in the second user plane security policy is not needed.

14. The system of claim 1, wherein the secondary Node is configured such that when user plane integrity protection indication information in the user plane security policy is preferred, the secondary Node determines whether to enable user plane integrity protection between the secondary Node and the user terminal.

15. The system of claim 14, wherein the secondary Node is configured to determine not to enable the user plane integrity protection between the secondary Node and the user terminal if the secondary Node does not support the user plane integrity protection.

16. The system of claim 1, further comprising a user plane network element, wherein the master Node is further configured to:
    receive first uplink user plane data from the user terminal; and
    send the first uplink user plane data to the secondary Node, wherein the secondary Node is further configured to:
        receive second uplink user plane data from the user terminal and the first uplink user plane data from the master Node;
        perform security deprotection on the first uplink user plane data and the second user plane data to obtain user plane data after security deprotection; and
        send the user plane data to the user plane network element after performing the security deprotection, wherein the first uplink user plane data and the second uplink user plane data are obtained after the user terminal performs security protection according to the user plane security protection method between the user terminal and the secondary Node.

17. A method for dual-connectivity communication, comprising:
receiving, by an apparatus, a message from a master Node, wherein the message comprises user plane security enabling type indication information and a security algorithm selected by a secondary Node, and wherein the user plane security enabling type indication information indicates a user plane security protection method between the secondary Node and the apparatus;
activating, by the apparatus, the user plane security protection method between the apparatus and the secondary Node according to the user plane security enabling type indication information and the security algorithm; and
performing, by the apparatus, security protection on uplink user plane data according to the user plane security protection method between the apparatus and the secondary Node.

18. The method of claim 17, wherein performing security protection on the uplink user plane data comprises sending first uplink user plane data and second uplink user plane data to the secondary Node and the master Node, respectively, wherein the first uplink user plane data and the second uplink user plane data are obtained after the apparatus performs security protection according to the user plane security protection method between the apparatus and the secondary Node.

19. The method according to claim 17, wherein a user plane security policy indicates a user plane security protection method between the master Node and a user terminal.

20. An apparatus comprising:
a processor coupled to a memory storing instructions and configured to execute the instructions to cause the apparatus to:
receive a message from a master Node, wherein the message comprises user plane security enabling type indication information and a security algorithm selected by a secondary Node, and wherein the user plane security enabling type indication information indicates a user plane security protection method between the secondary Node and the apparatus;
activate the user plane security protection method between the apparatus and the secondary Node according to the user plane security enabling type indication information and the security algorithm by the secondary Node; and
perform security protection on uplink user plane data according to the user plane security protection method between the apparatus and the secondary Node.

21. The apparatus of claim 20, wherein the instructions further cause the apparatus to send first uplink user plane data and second uplink user plane data to the secondary Node and the master Node, respectively, and wherein the first uplink user plane data and the second user plane data are obtained after the apparatus performs security protection according to the user plane security protection method between the apparatus and the secondary Node.

22. A method for dual-connectivity communication, comprising:
sending, by a master Node, a first message, wherein the first message comprises a user plane security policy;
receiving, by a secondary Node, the first message from the master Node;
determining, by the secondary Node, a user plane security protection method between the secondary Node and a user terminal according to the user plane security policy;
sending, by the secondary Node, a second message to the master Node, wherein the second message comprises user plane security enabling type indication information, and wherein the user plane security enabling type indication information indicates the user plane security protection method between the secondary Node and the user terminal; and
sending, by the master Node, a third message to the user terminal, wherein the third message comprises the user plane security enabling type indication information.

23. The method according to claim 22, further comprising determining, by the master Node, that user plane integrity protection indication information in the user plane security policy is not required if the secondary Node does not support user plane integrity protection.

24. The method according to claim 22, wherein the second message further comprises a security algorithm between the secondary Node and the user terminal, and wherein the third message further comprises the security algorithm between the secondary Node and the user terminal.

25. The method according to claim 22, wherein the user plane security policy in the first message is a second user plane security policy, wherein the method further comprising obtaining, by the master Node, a first user plane security policy of the user terminal, and wherein the first user plane security policy is from a session management network element.

26. The method according to claim 25, further comprising determining, by the master Node, the second user plane security policy according to the first user plane security policy of the user terminal.

27. The method according to claim 26, wherein user plane integrity protection indication information in the second user plane security policy is not needed when the secondary Node does not support user plane integrity protection and user plane integrity protection indication information in the first user plane security policy is preferred.

28. The method according to claim 22, further comprising:
receiving, by the master Node, first uplink user plane data from the user terminal;
sending, by the master Node, the first uplink user plane data to the secondary Node;
receiving, by the secondary Node, second uplink user plane data from the user terminal and the first uplink user plane data from the master Node;
performing, by the secondary Node, security deprotection on the first uplink user plane data and the second user plane data to obtain user plane data after security deprotection; and
sending, by the secondary Node, the user plane data to a user plane network element after performing the security deprotection, wherein the first uplink user plane data and the second uplink user plane data are obtained after the user terminal performs security protection according to the user plane security protection method between the user terminal and the secondary Node.

29. The method according to claim 22, wherein the user plane security policy indicates a user plane security protection method between the master Node and the user terminal.

30. A method for dual-connectivity communication, comprising:
- sending, by a master Node, a first message to a secondary Node, wherein the first message comprises a user plane security policy of a user terminal, wherein the user plane security policy, which indicates a user plane security protection method between the master Node and the user terminal, is for the secondary Node to determine user plane security protection method between the secondary Node and the user terminal;
- receiving, by the master Node, a second message from the secondary Node, wherein the second message comprises user plane security enabling type indication information, and wherein the user plane security enabling type indication information indicates the user plane security protection method between the secondary Node and the user terminal; and
- sending, by the master Node, a third message to the user terminal, wherein the third message comprises the user plane security enabling type indication information.

31. The method according to claim 30, wherein the user plane security policy in the first message is a second user plane security policy, and wherein the method further comprises:
- obtaining, by the master Node, a first user plane security policy of the user terminal from a session management network element; and
- generating, by the master Node, the second user plane security policy according to the first user plane security policy.

32. The method according to claim 30, further comprising determining, by the master Node before sending the first message, that user plane integrity protection indication information in the user plane security policy is not required if the secondary Node does not support user plane integrity protection.

33. The method according to claim 30, wherein the second message further comprises a security algorithm between the secondary Node and the user terminal, and wherein the third message further comprises the security algorithm between the secondary Node and the user terminal.

34. A master Node, comprising:
- a processor coupled to a memory storing instructions and configured to execute the instructions to cause the master Node to:
  - send a first message to a secondary Node, wherein the first message comprises a user plane security policy of a user terminal, wherein the user plane security policy, which indicates a user plane security protection method between the master Node and the user terminal, is for the secondary Node to determine user plane security protection method between the secondary Node and the user terminal;
  - receive a second message from the secondary Node, wherein the second message comprises user plane security enabling type indication information, and wherein the user plane security enabling type indication information indicates the user plane security protection method between the secondary Node and the user terminal; and
  - send a third message to the user terminal, wherein the third message comprises the user plane security enabling type indication information.

35. The master Node of claim 34, wherein the user plane security policy in the first message is a second user plane security policy, and wherein the instructions further cause the master Node to:
- obtain a first user plane security policy of the user terminal from a session management network element; and
- generate the second user plane security policy according to the first user plane security policy.

36. The master Node according to claim 34, wherein the instructions further cause the master Node to determine, before sending the first message, that user plane integrity protection indication information in the user plane security policy is not required if the secondary Node does not support user plane integrity protection.

* * * * *